(12) United States Patent
Schütt et al.

(10) Patent No.: US 6,623,064 B2
(45) Date of Patent: Sep. 23, 2003

(54) CONVERTIBLE MOTOR VEHICLE ROOF

(75) Inventors: Thomas Schütt, Fürstenfeldbruck (DE); Jens Bader, München (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/943,734

(22) Filed: Sep. 4, 2001

(65) Prior Publication Data

US 2002/0084678 A1 Jul. 4, 2002

(30) Foreign Application Priority Data

Sep. 4, 2000 (DE) .......................... 100 43 712

(51) Int. Cl.⁷ .............................. B60J 7/14; B60J 7/047
(52) U.S. Cl. ............. 296/108; 296/216.01; 296/220.01
(58) Field of Search ........................... 296/108, 107.13, 296/107.15–107.2, 220.01

(56) References Cited

U.S. PATENT DOCUMENTS

| 2,210,590 | A | * | 8/1940 | Jobst | ..................... 296/107.17 |
| 5,078,447 | A | * | 1/1992 | Klein et al. | .............. 296/107.2 |
| 5,542,735 | A | * | 8/1996 | Furst et al. | ............ 296/107.18 |
| 5,558,388 | A | * | 9/1996 | Furst et al. | ............. 296/108 X |

FOREIGN PATENT DOCUMENTS

| DE | 36 35 887 | | 5/1988 | |
| DE | 3930343 | * | 3/1991 | .............. 296/107.2 |
| DE | 4203228 | * | 8/1993 | ............ 296/107.15 |
| DE | 195 03 786 | | 8/1996 | |
| DE | 197 37 259 | | 3/1999 | |
| EP | 0 989 008 | | 3/2000 | |
| GB | 223789 | * | 11/2002 | ............ 296/107.18 |
| JP | 360244620 | * | 12/1985 | ............ 296/107.18 |
| JP | 402117420 | * | 5/1990 | ............ 296/107.18 |

* cited by examiner

Primary Examiner—Dennis H. Pedder
(74) Attorney, Agent, or Firm—Nixon Peabody LLP; David S. Safran

(57) ABSTRACT

A convertible motor vehicle roof, especially for hatchbacks or pickups, with at least one roof part which is supported to move lengthwise on the side roof members and when the roof is being opened, can be moved into the storage position. The roof part or roof parts can be moved onto a roof unit or rear unit before lowering of the roof into a storage space. The storage space compactly accommodates the roof part or the roof parts arranged stacked therein so that due to the reduced space requirement, the possibilities for movement and storage for the movable and storable roof parts on the motor vehicle body are improved.

9 Claims, 31 Drawing Sheets

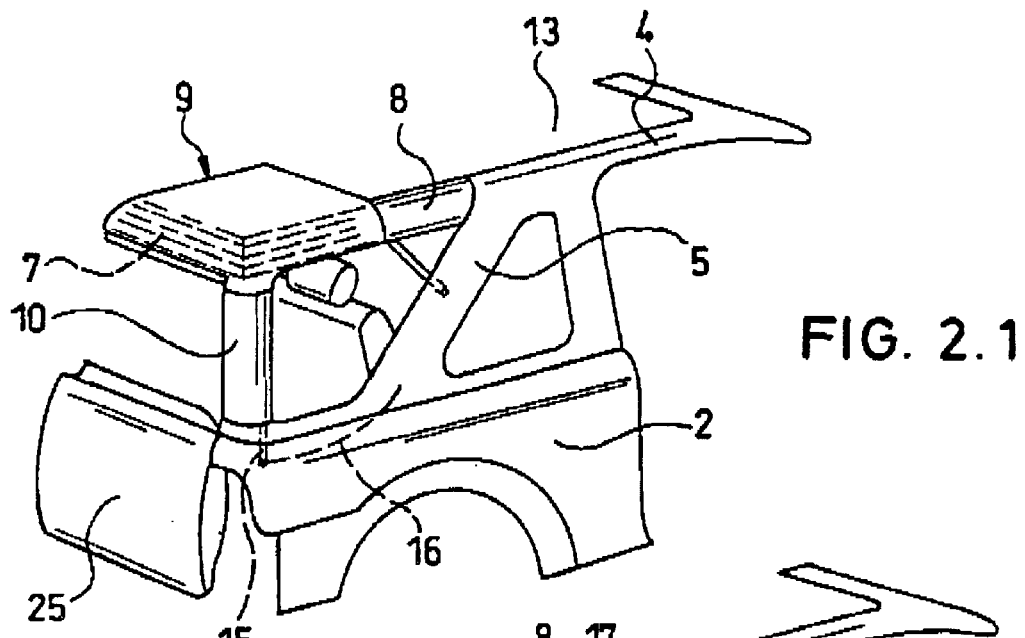
FIG. 2.1
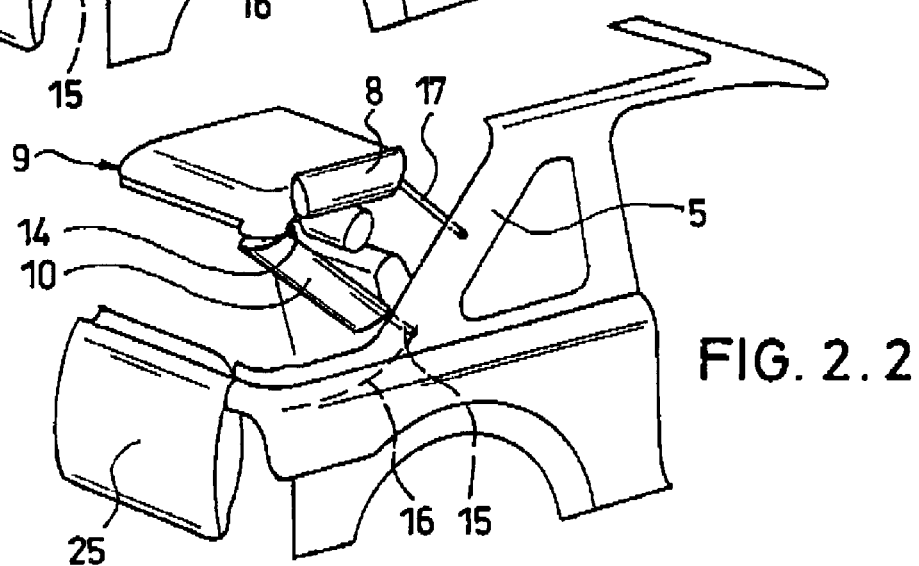
FIG. 2.2
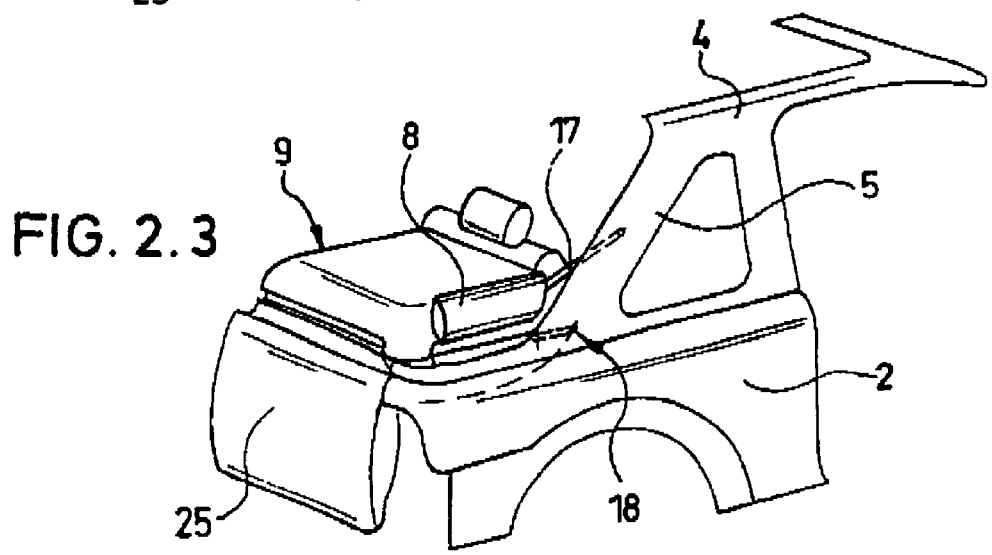
FIG. 2.3

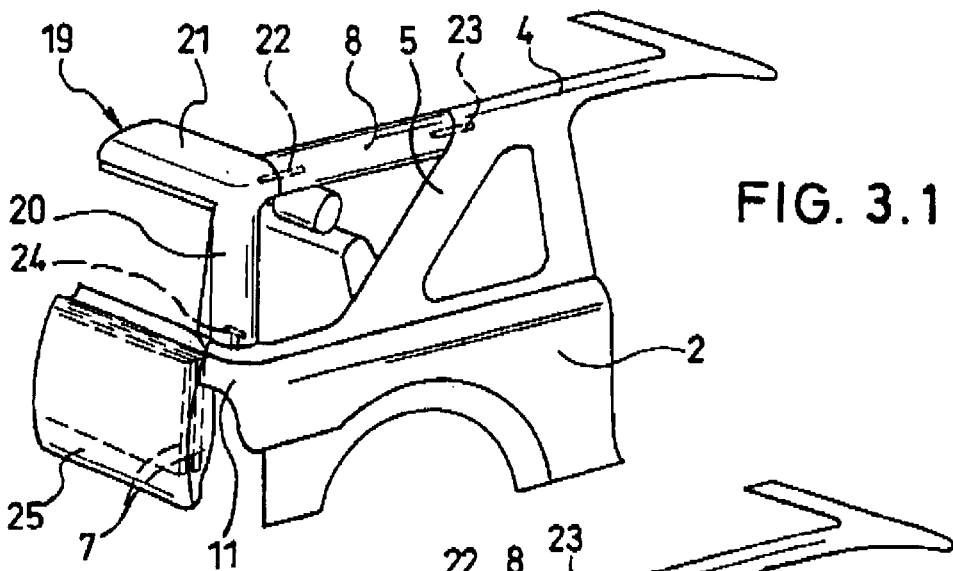
FIG. 3.1
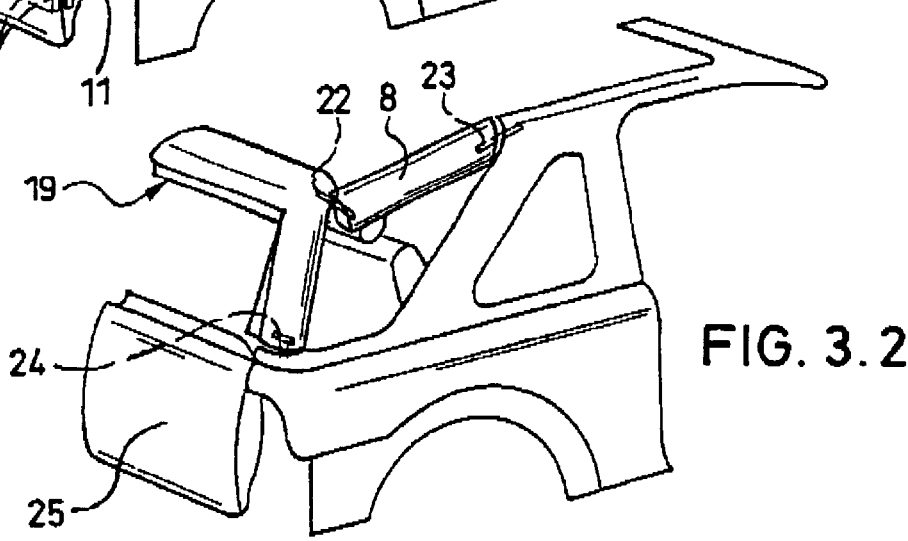
FIG. 3.2
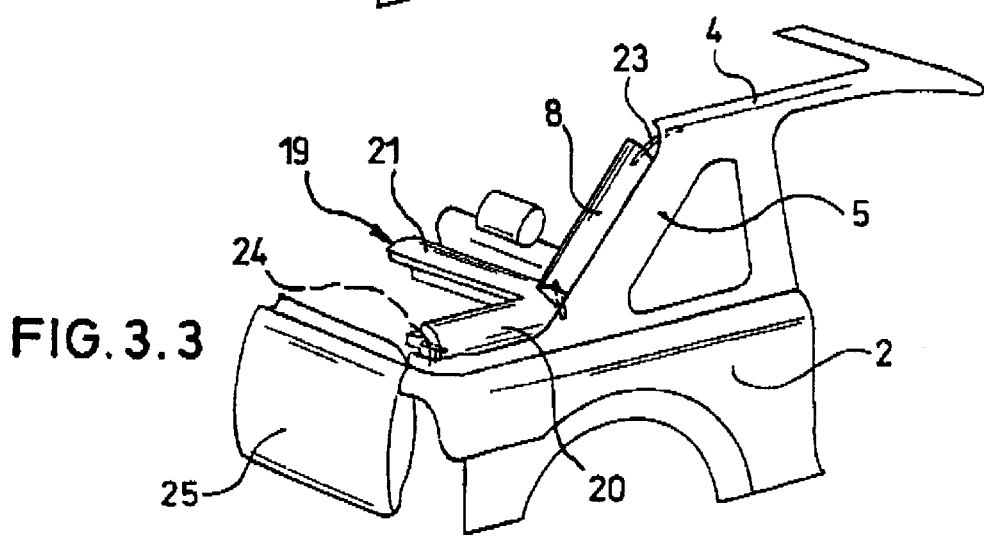
FIG. 3.3

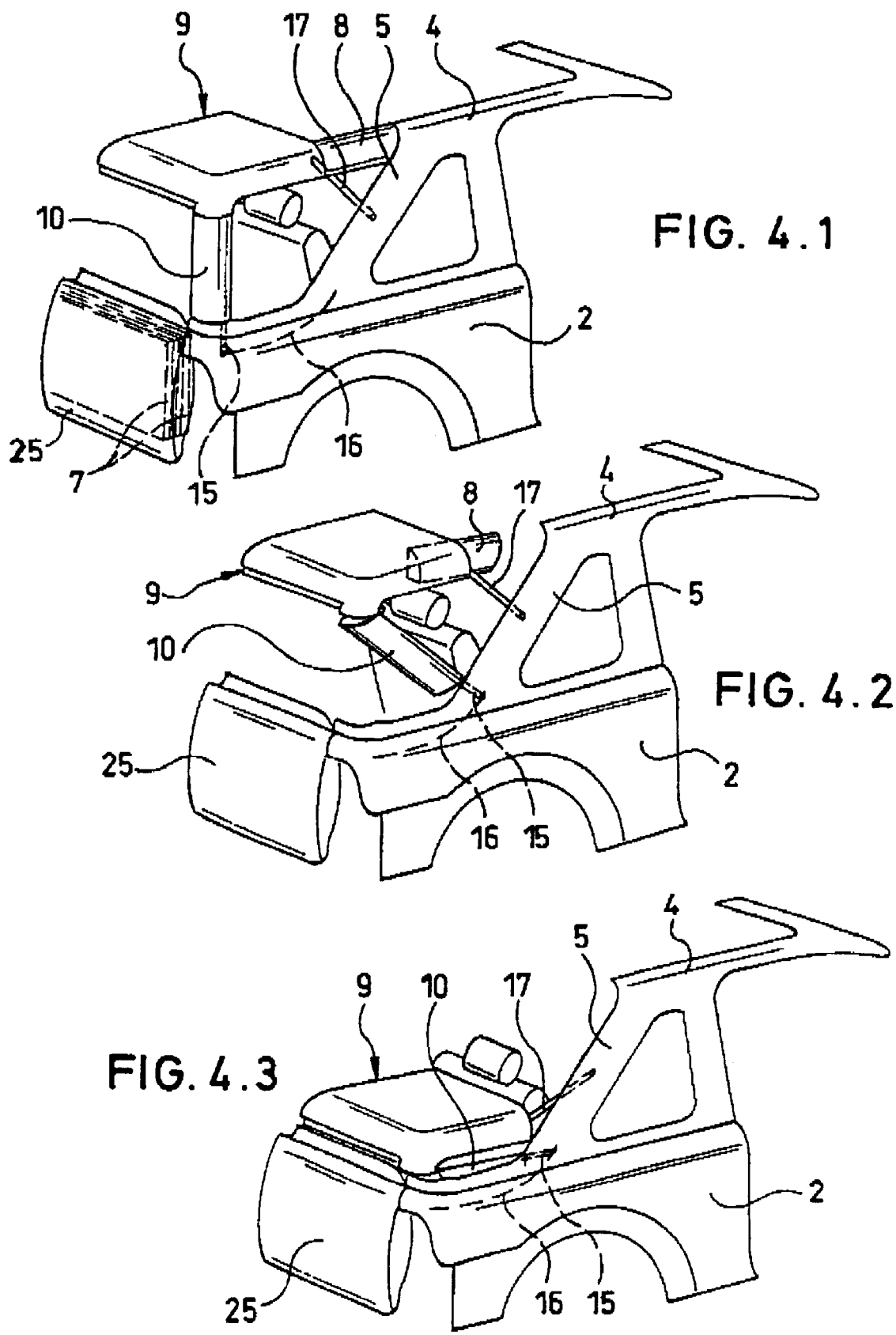

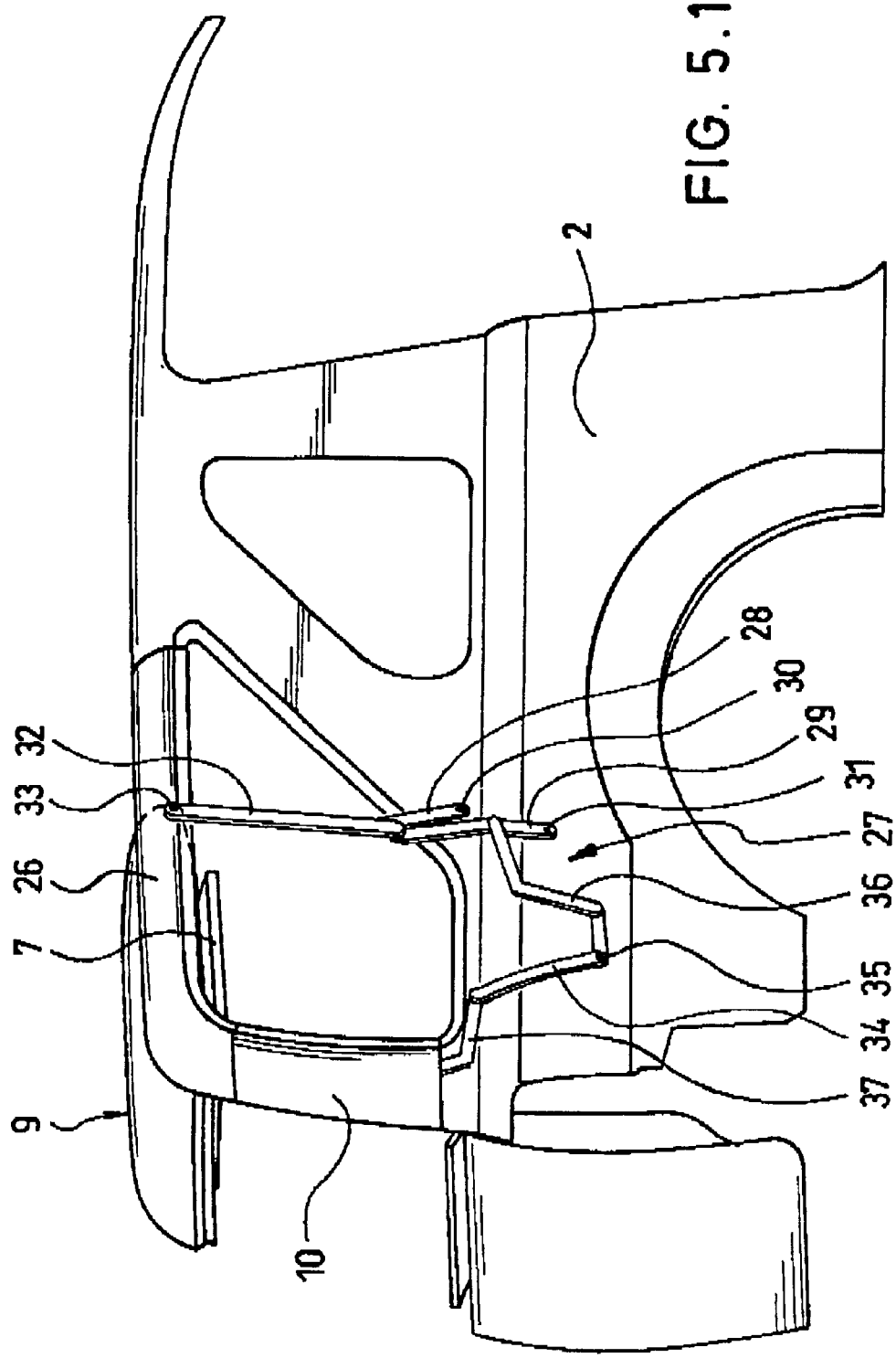

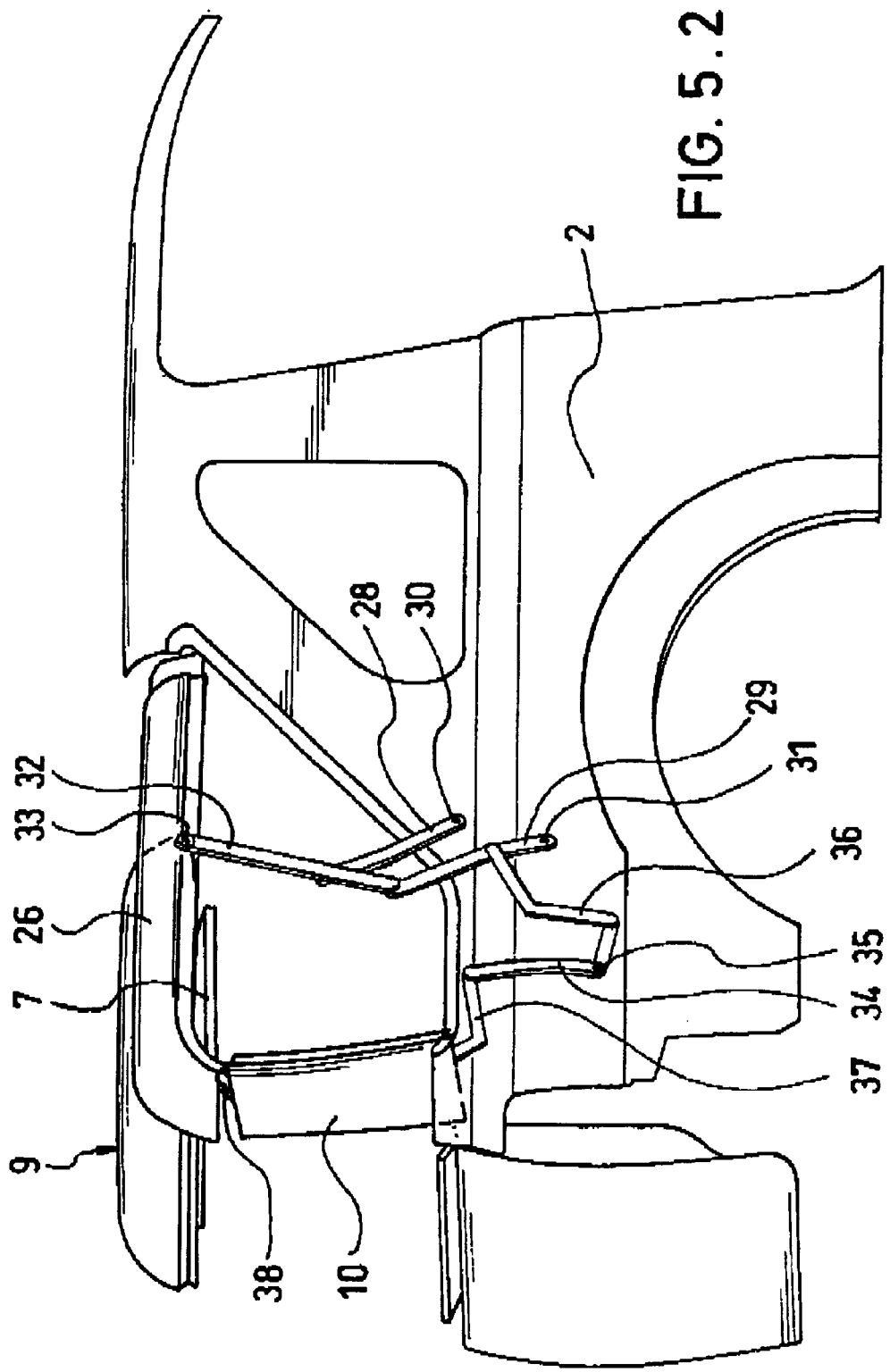
FIG. 5.2

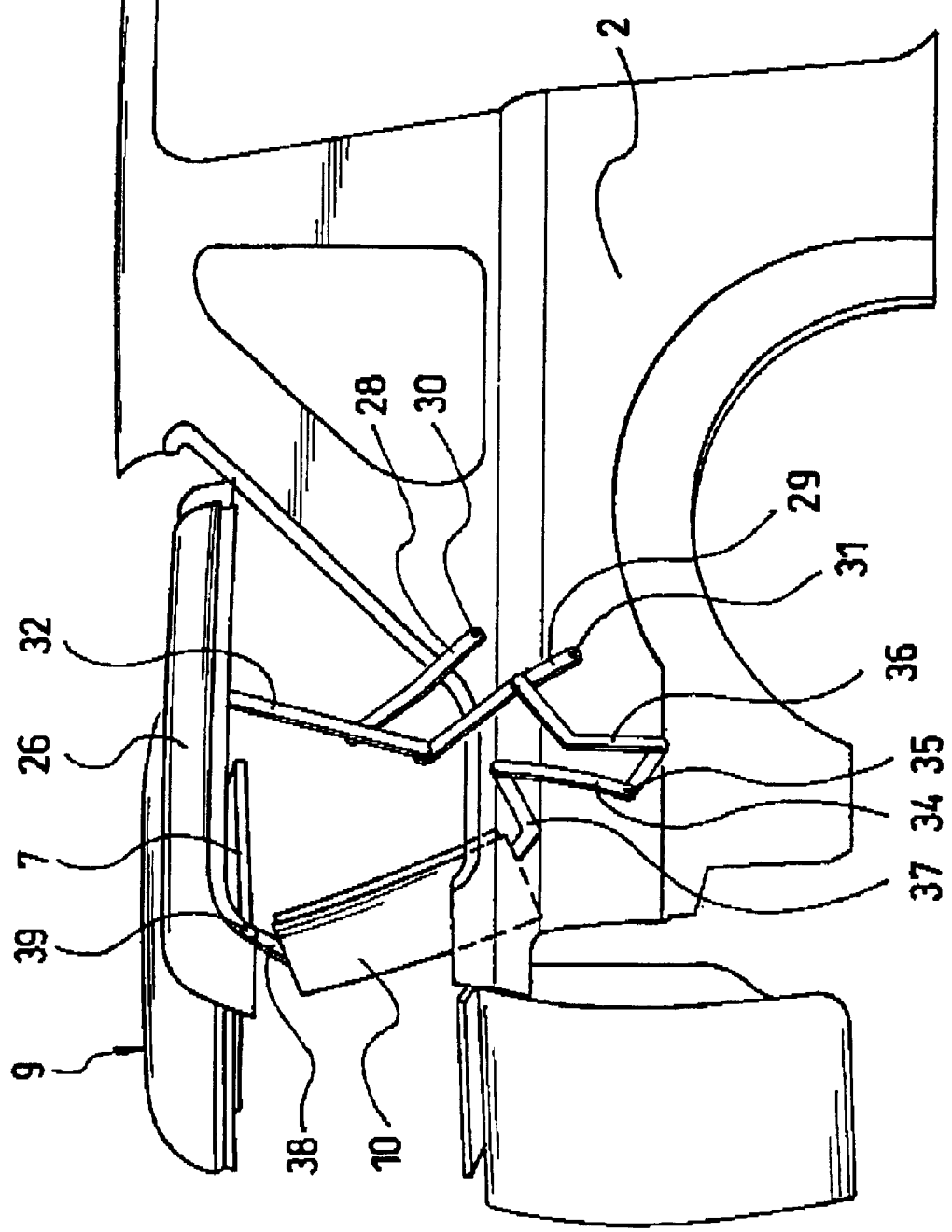
FIG. 5.3

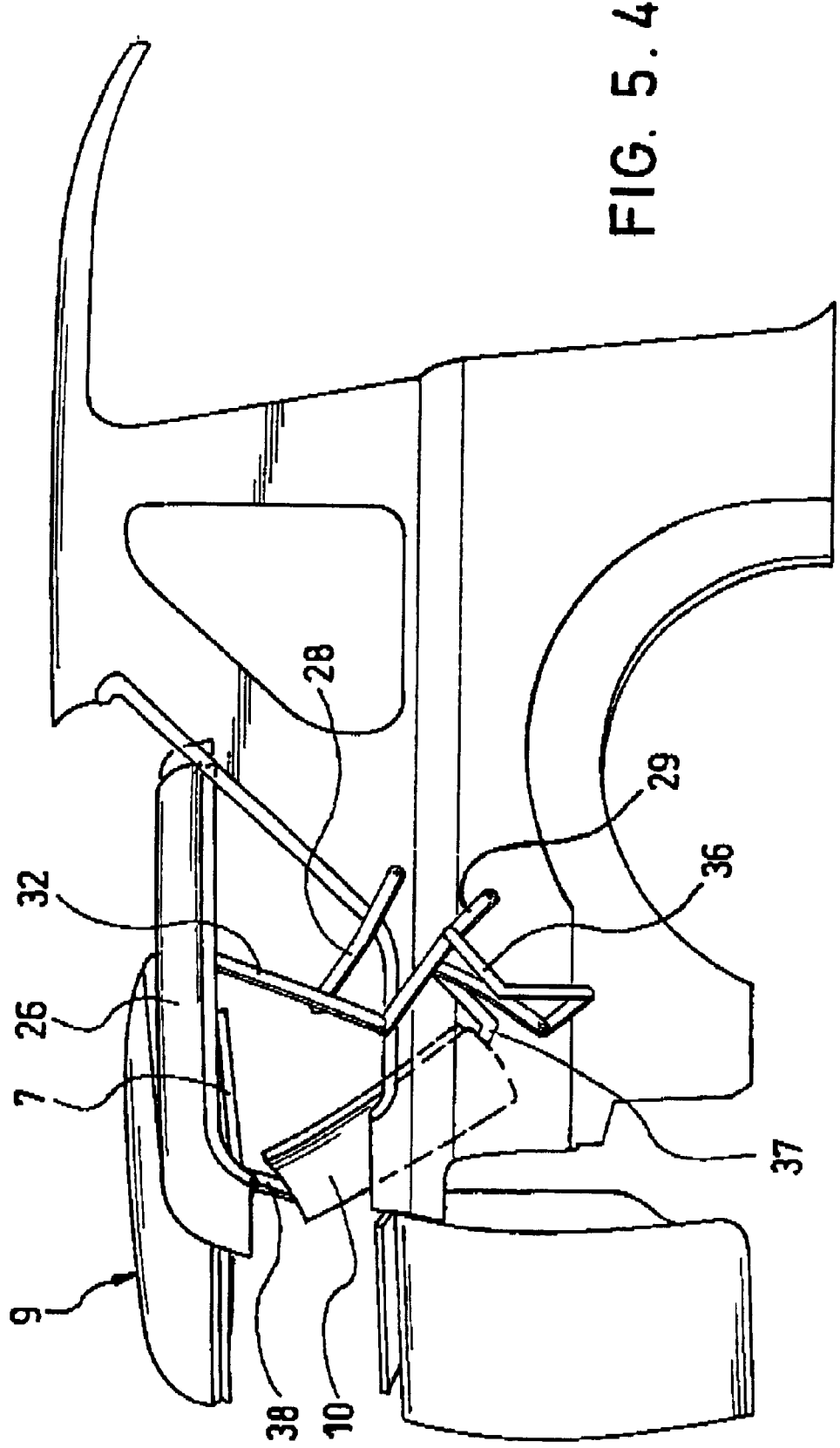

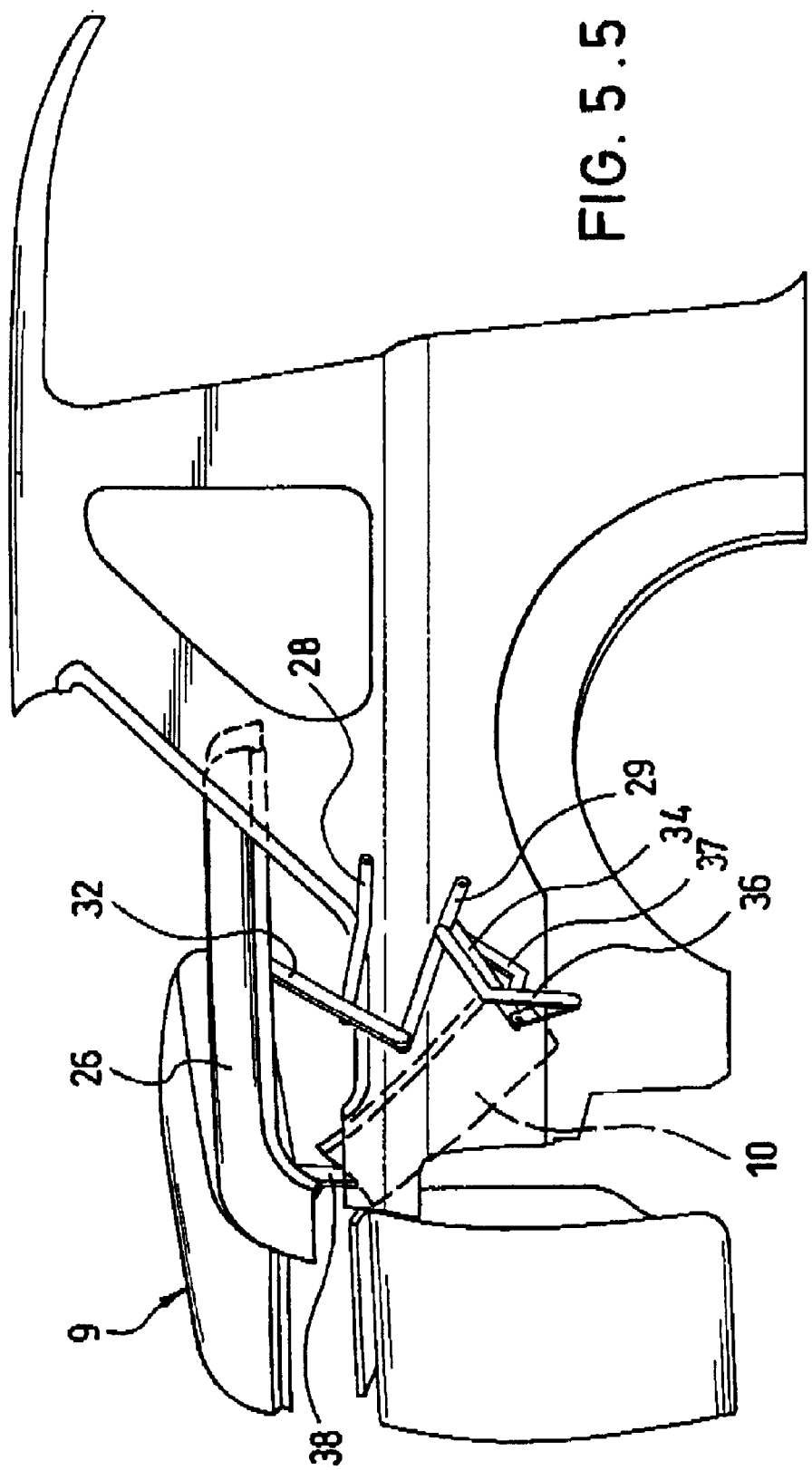

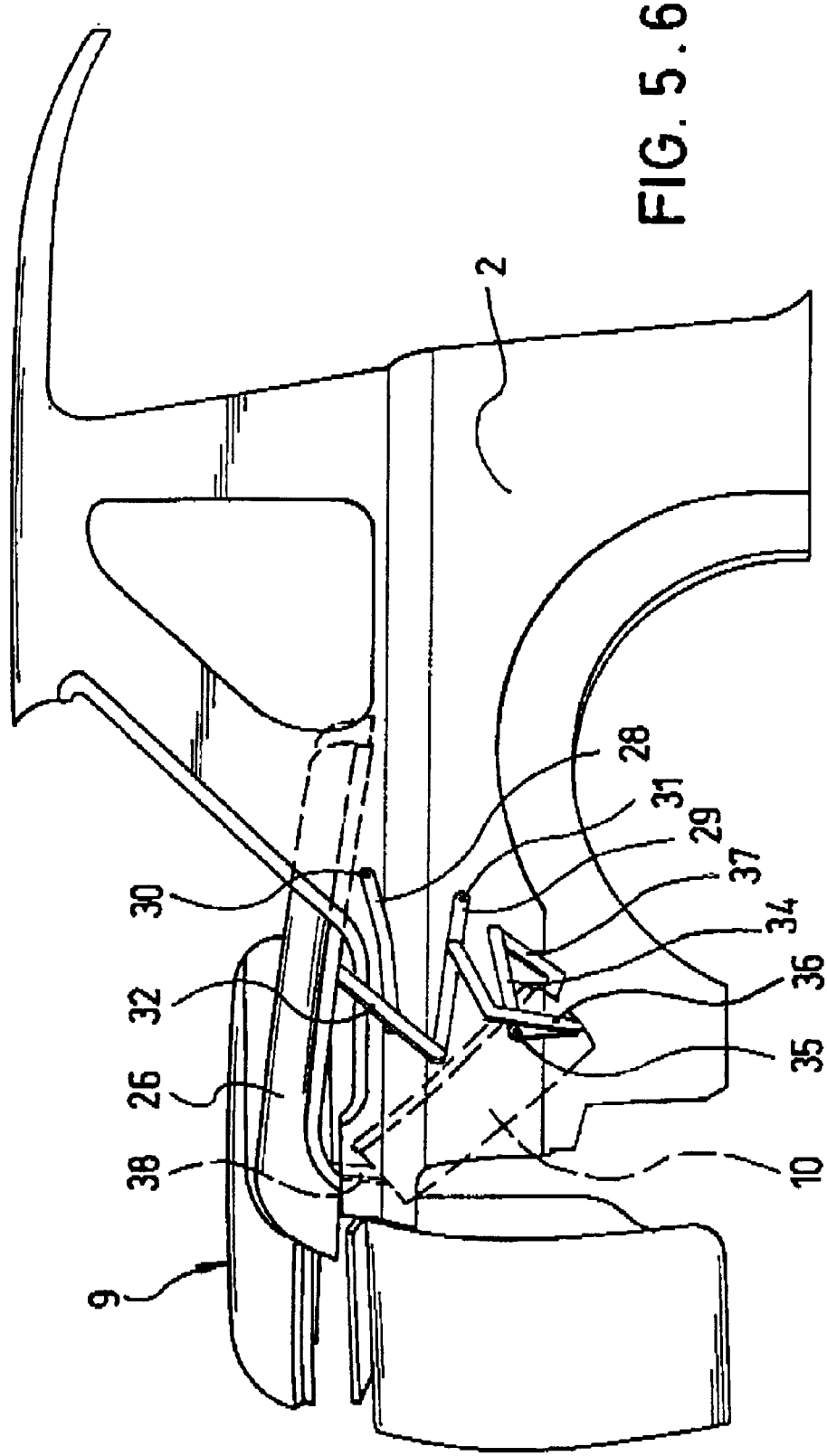
FIG. 5.6

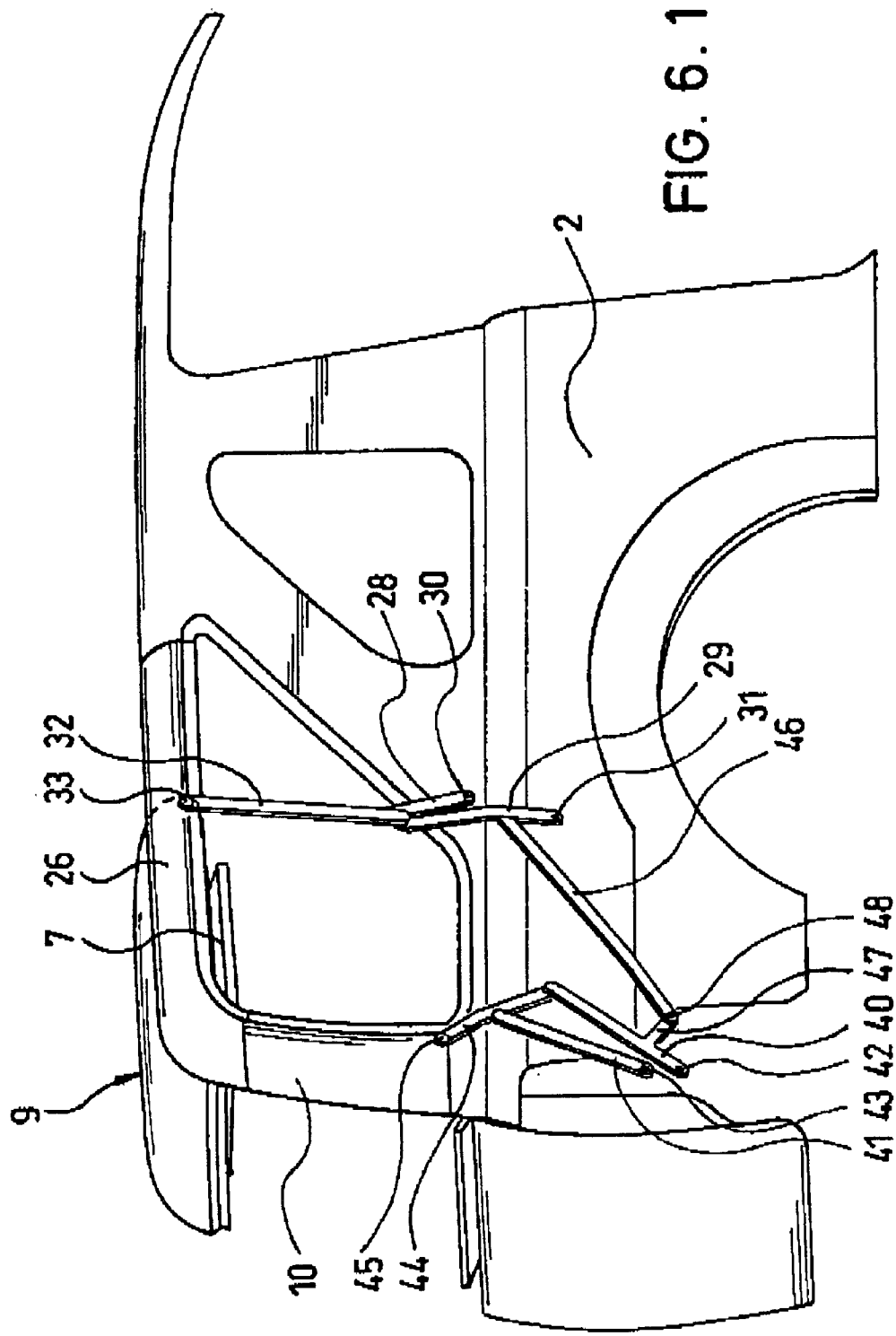

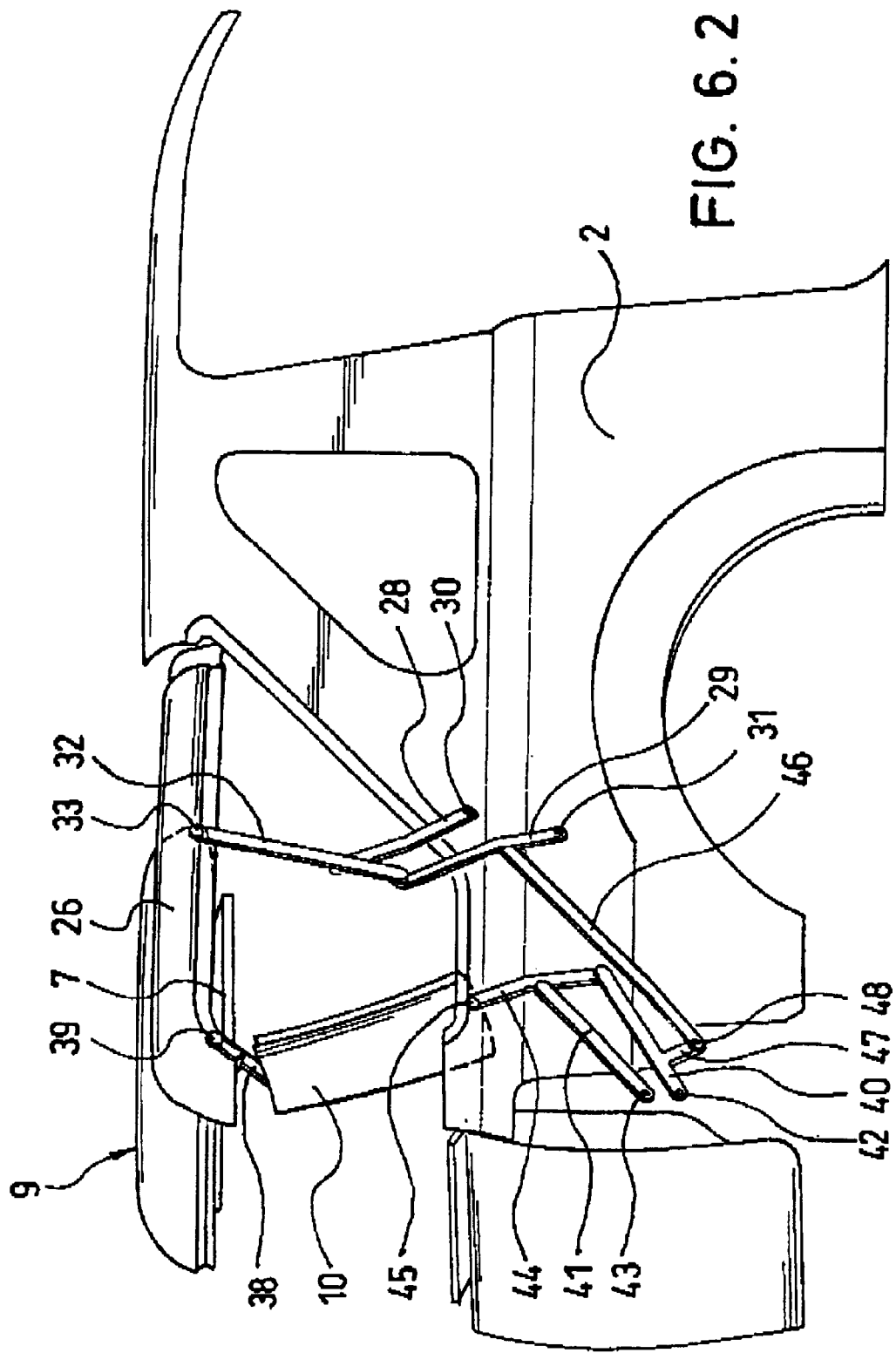
FIG. 6.2

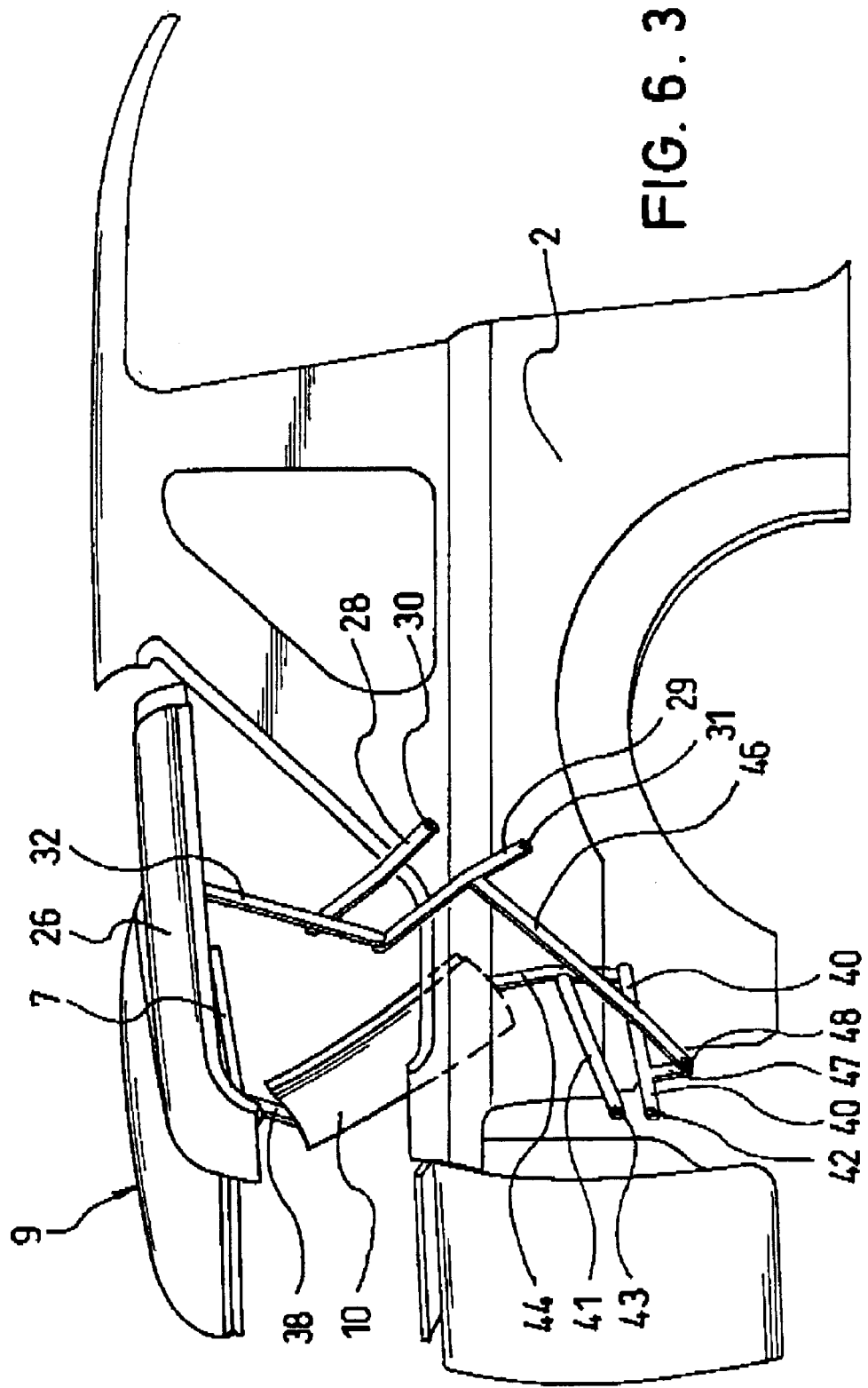

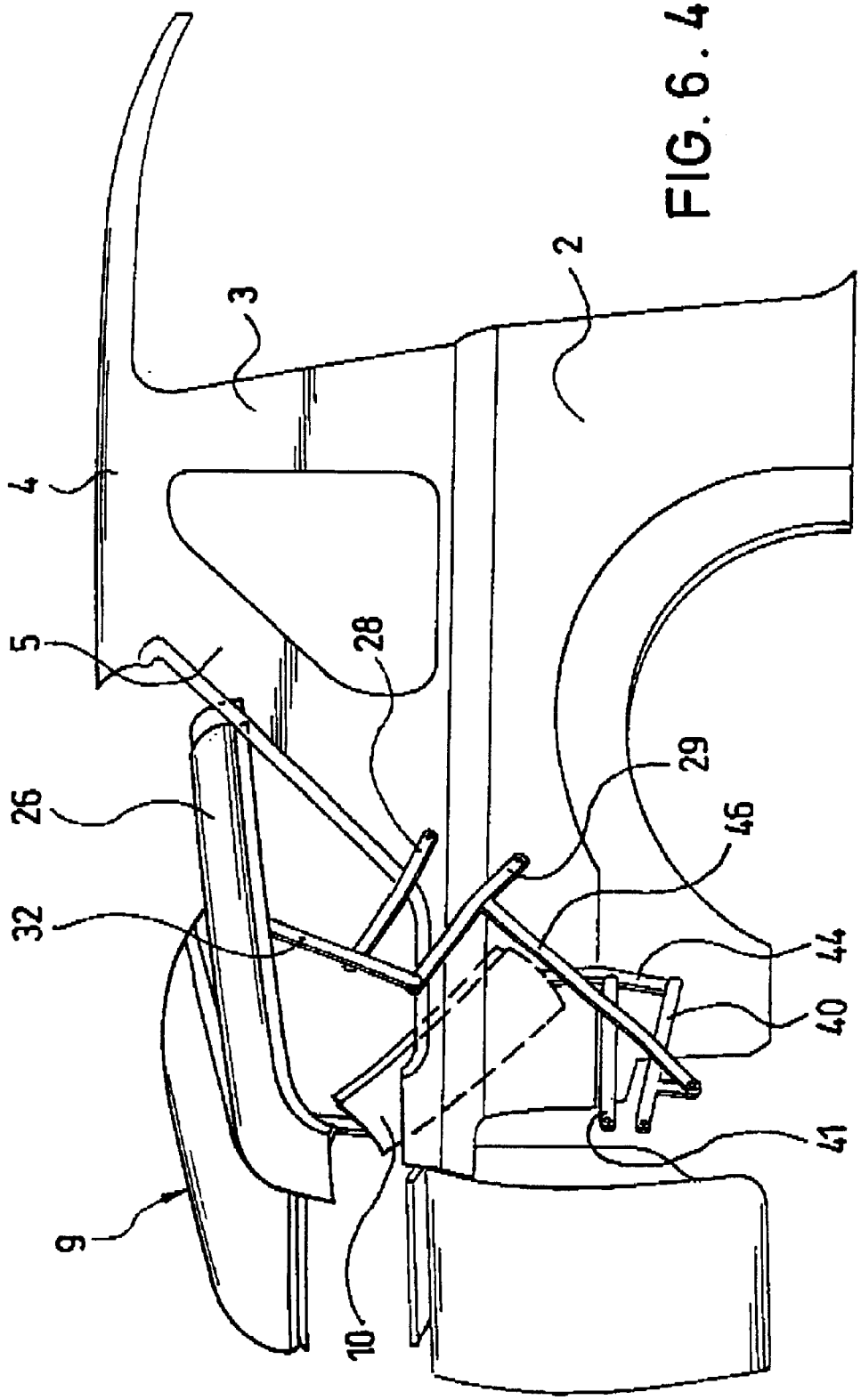

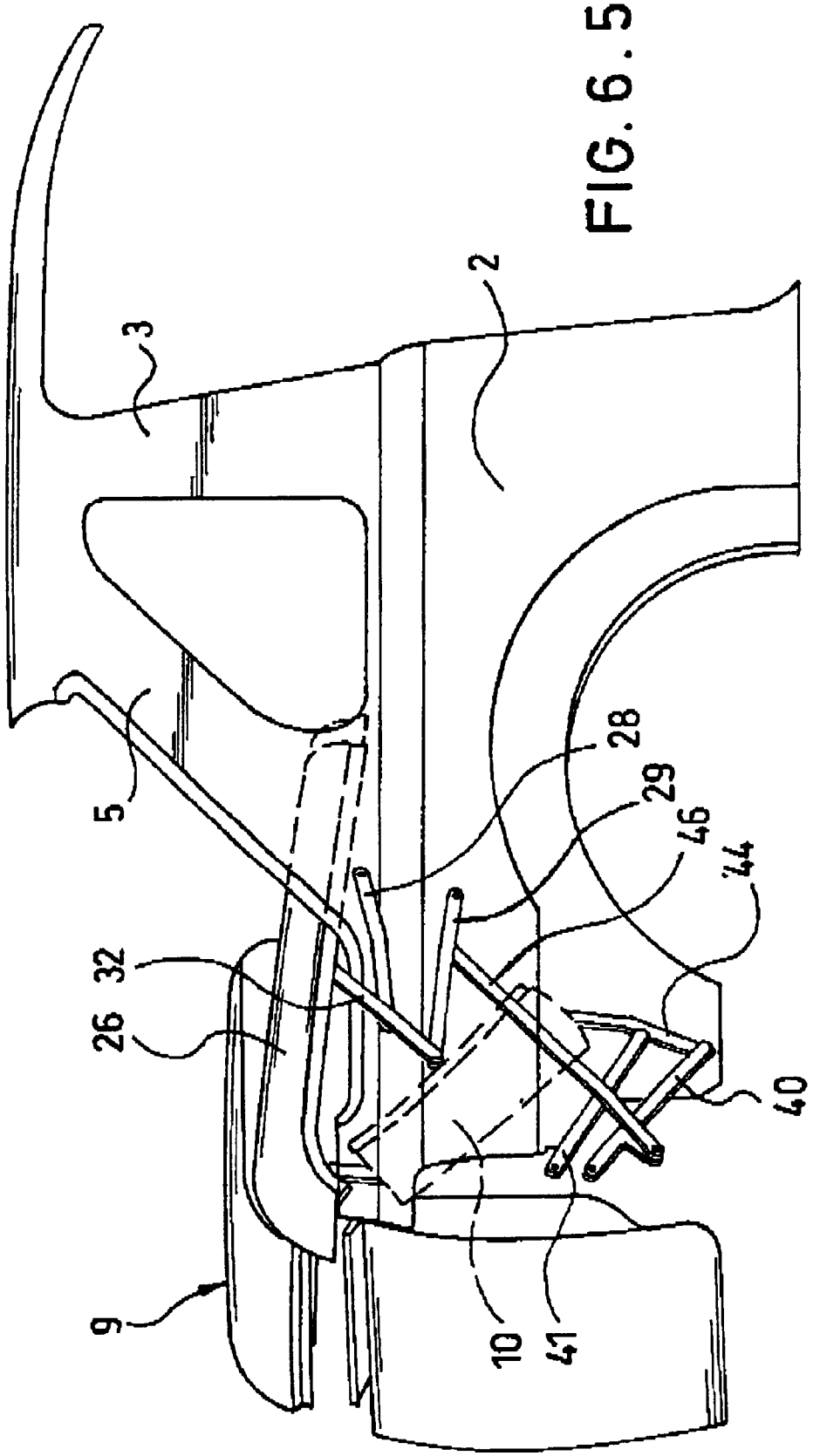

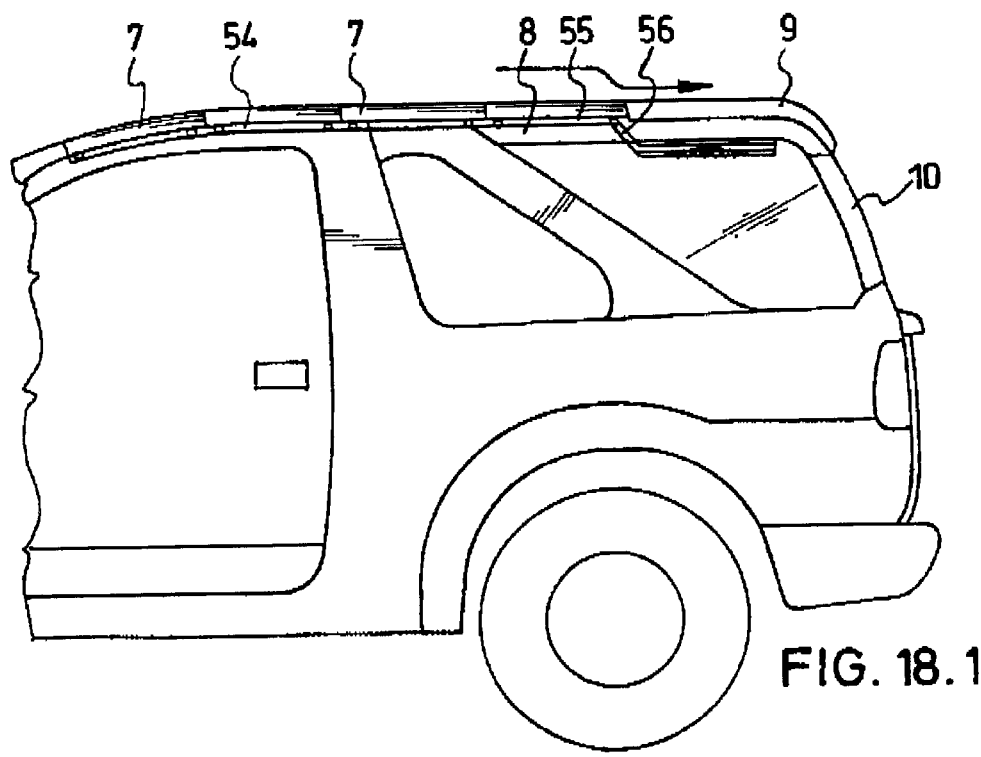
FIG. 18.1
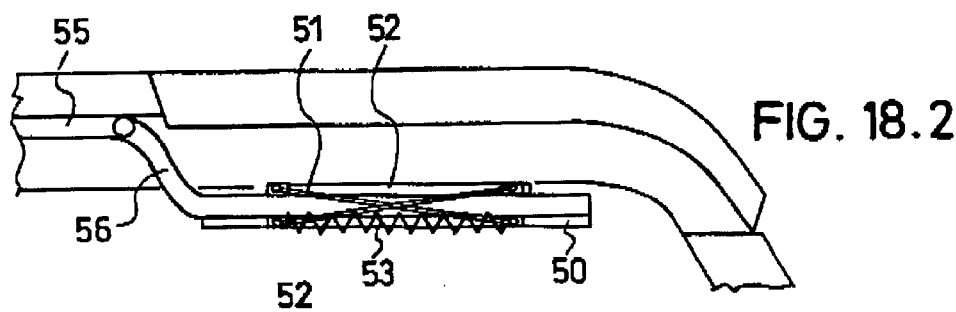
FIG. 18.2
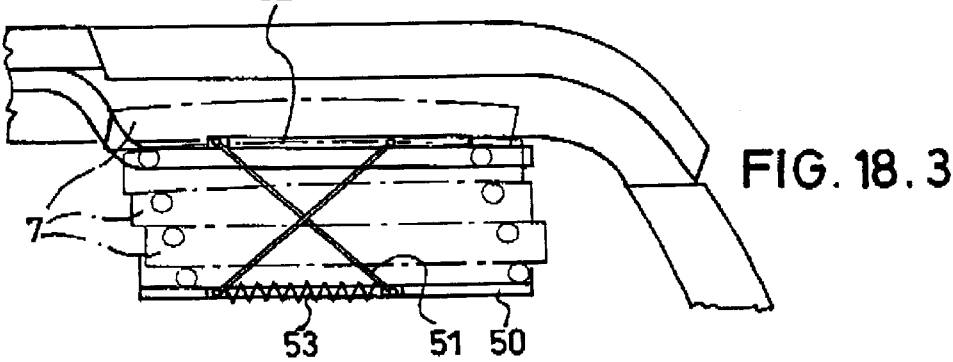
FIG. 18.3

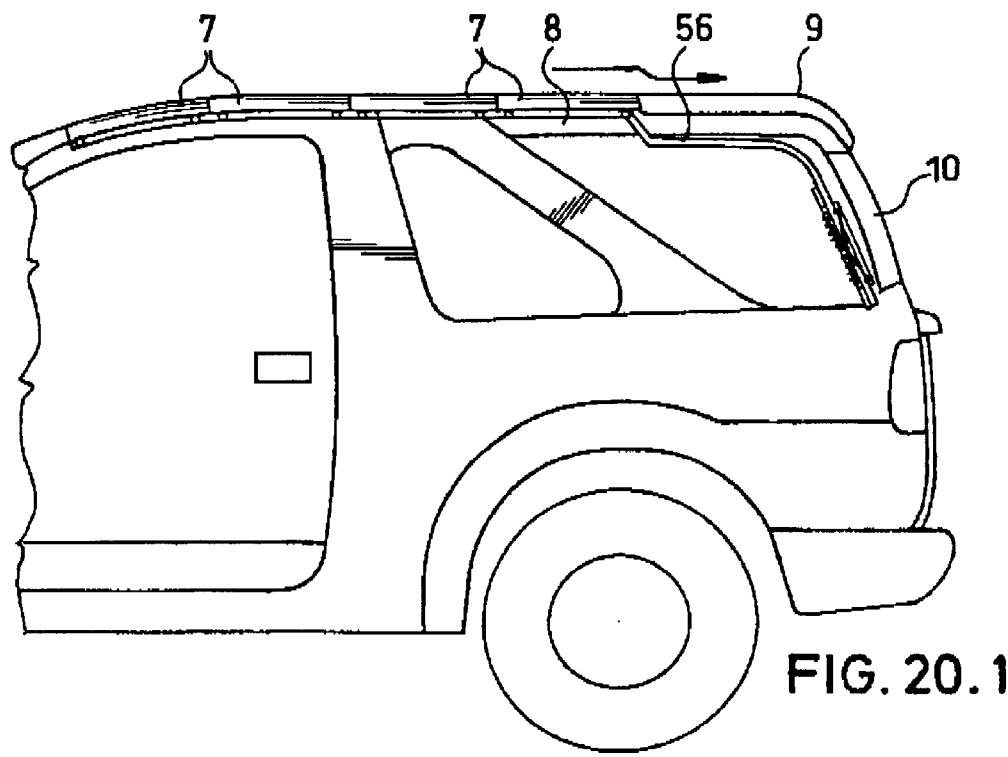
FIG. 20.1
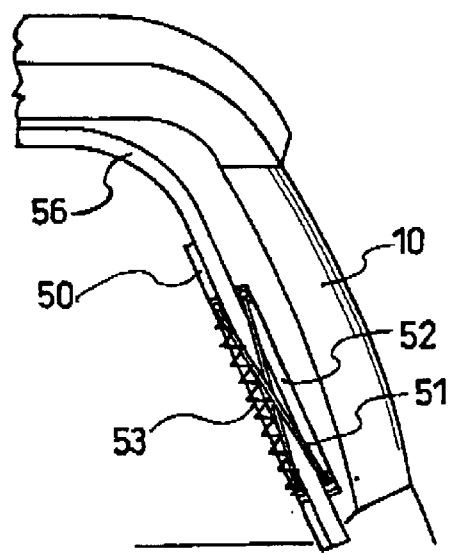
FIG. 20.2
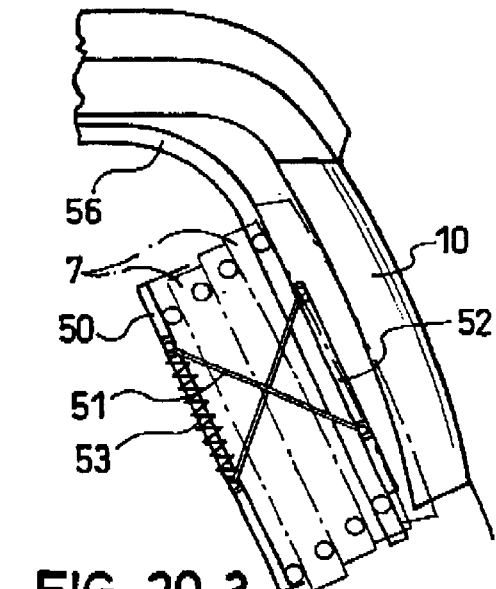
FIG. 20.3

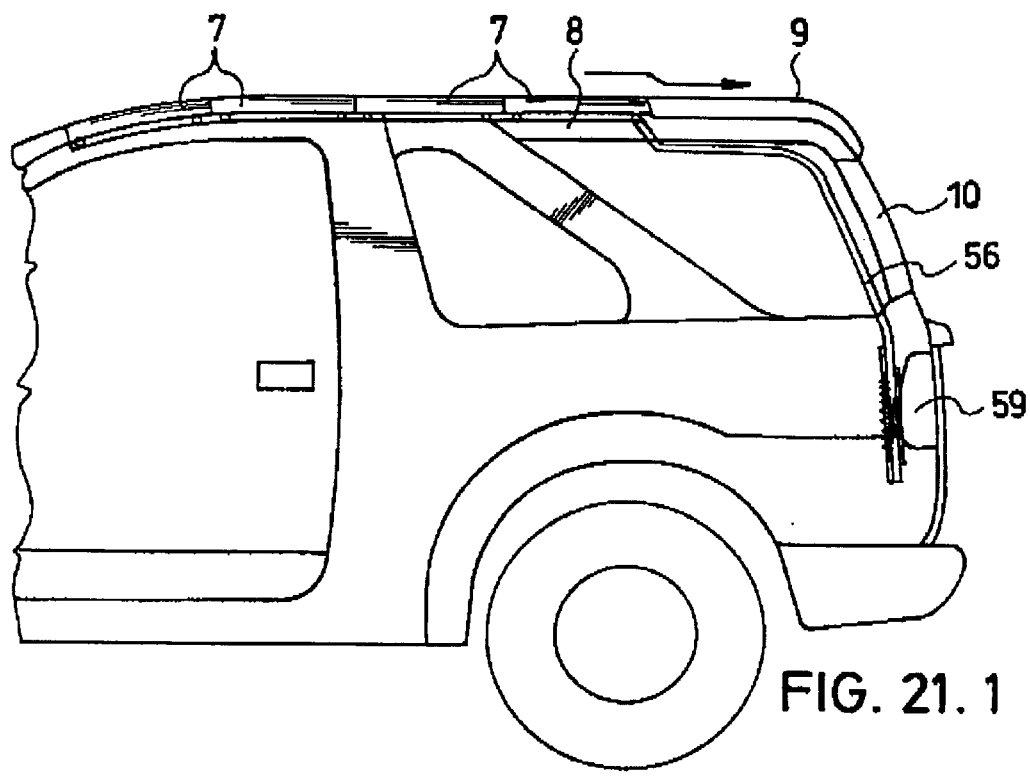
FIG. 21.1
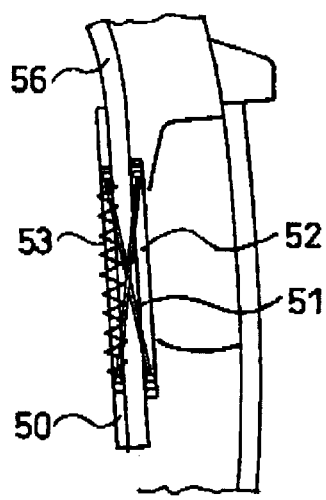
FIG. 21.2
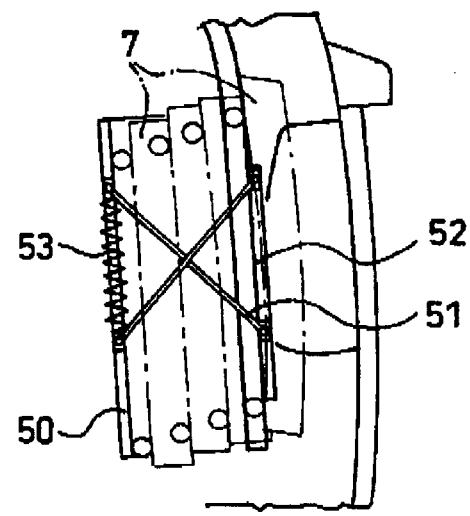
FIG. 21.3

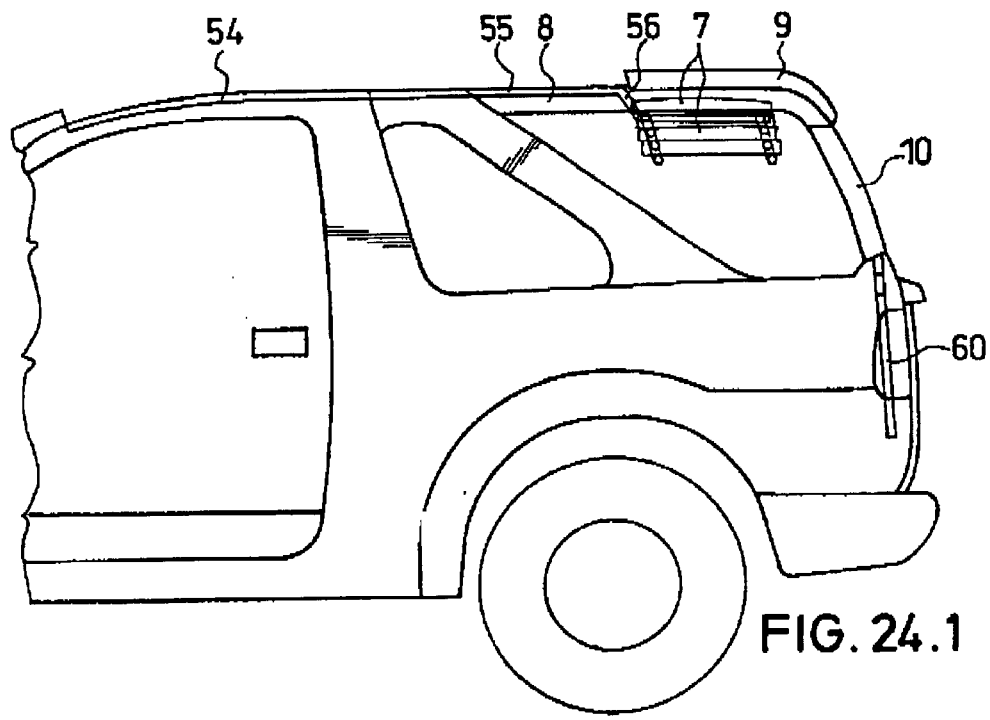
FIG. 24.1
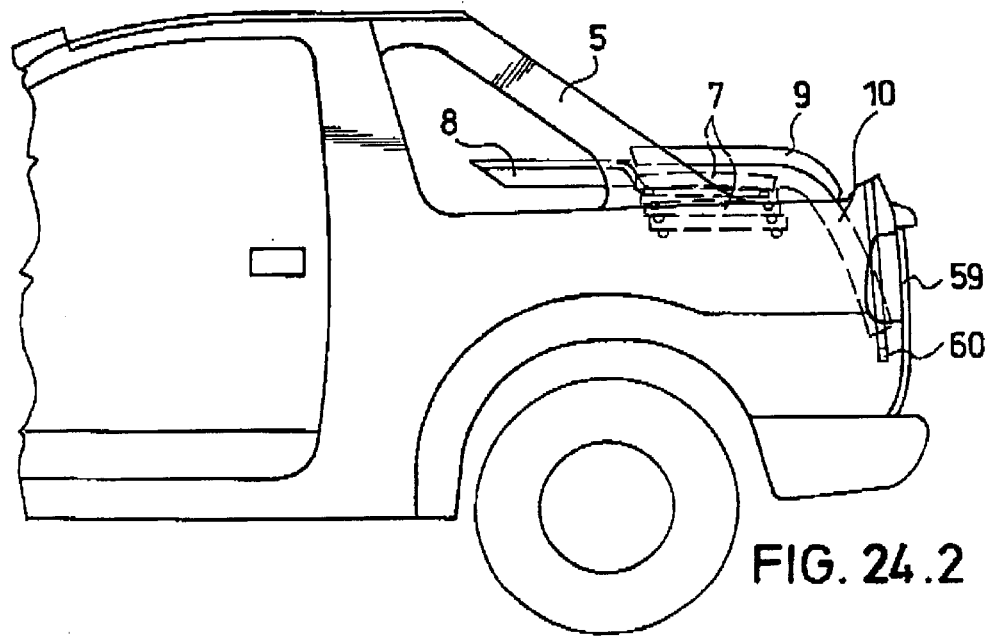
FIG. 24.2

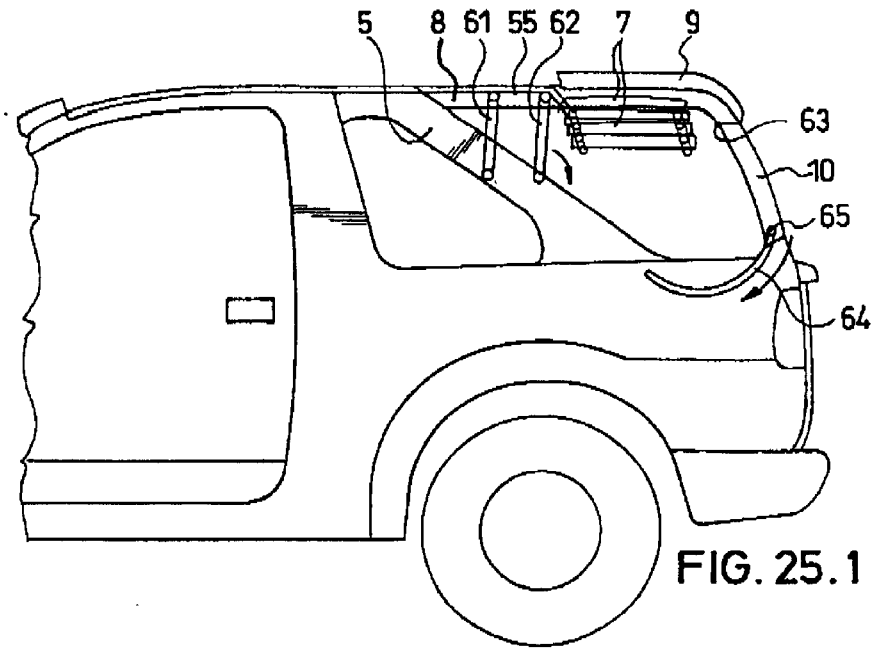
FIG. 25.1
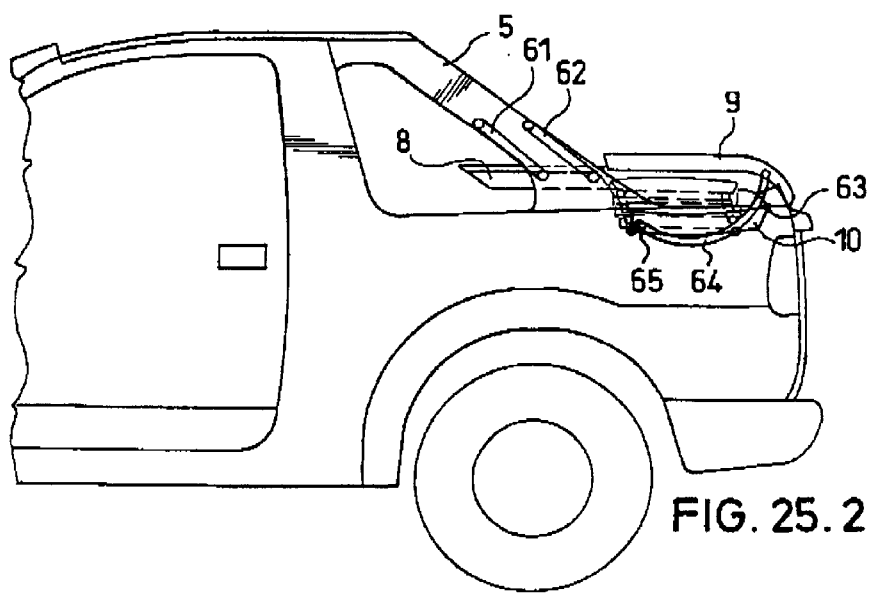
FIG. 25.2

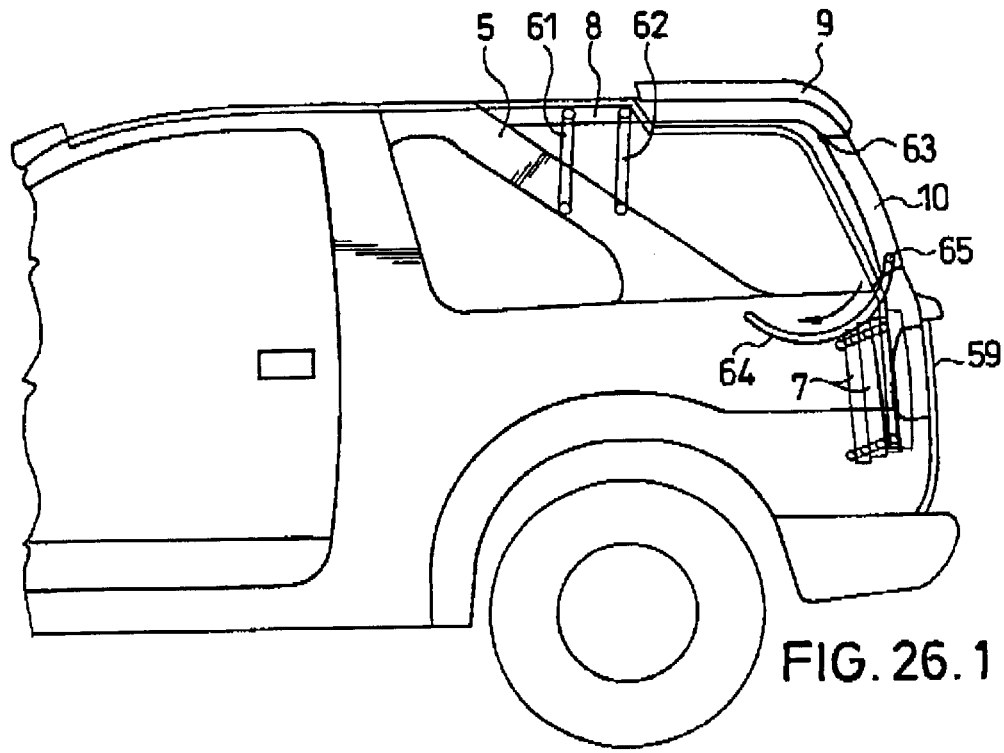
FIG. 26.1
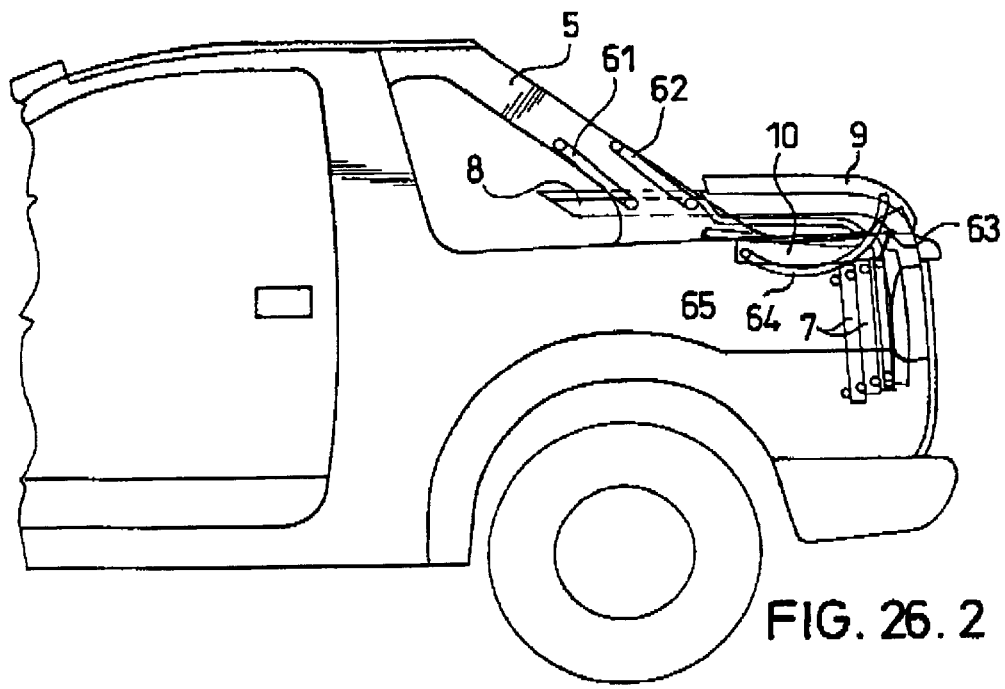
FIG. 26.2

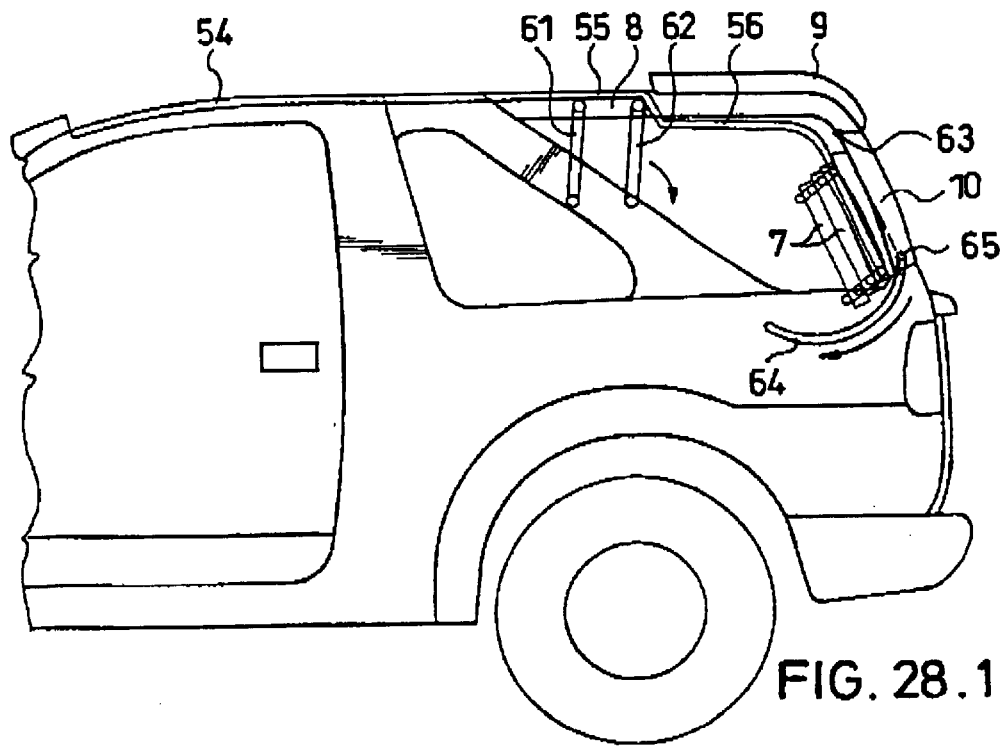
FIG. 28.1
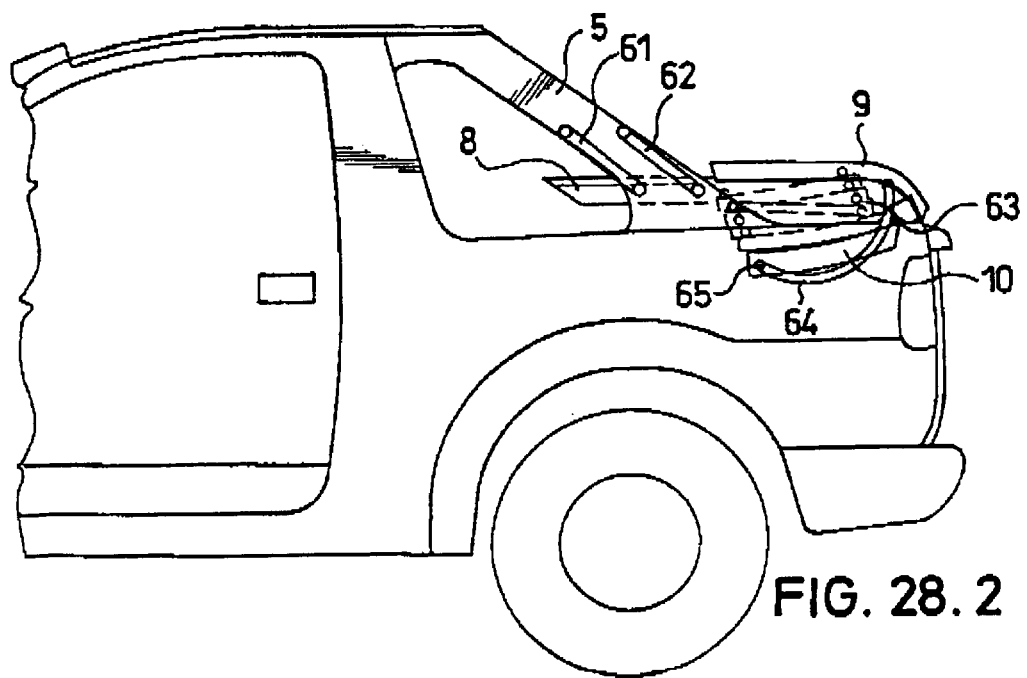
FIG. 28.2

CONVERTIBLE MOTOR VEHICLE ROOF

BACKGROUND OF THE INVENTION

1. Field of the Invention

The present invention relates to a convertible motor vehicle roof such as for hatchbacks or pickups.

2. Description of Related Art

The published European application EP 0 989 008 A2 discloses one such motor vehicle roof for a motor vehicle which has a louvered roof with several louvered roof parts which are arranged behind one another. The louvered roof parts are hinged to one another and are movably supported on guides on side lengthwise roof frames or side roof members. To open the louvered roof, the louvered roof parts are moved on the guides to the rear into a storage space in a rear door and then are arranged, stacked in a vertical alignment.

SUMMARY OF THE INVENTION

The primary object of the invention is to provide a convertible motor vehicle roof with greater flexibility. Another object of the invention is to provide such a convertible motor vehicle roof with at least one roof part which is supported to move lengthwise on the side roof members so that when the roof is being opened, the roof part is movable into a storage position.

These and other objects and advantages are achieved in the aforementioned motor vehicle roof in accordance with the present invention in that the roof part or roof parts are moveable onto a roof unit or rear unit before lowering of the roof into a storage space. The storage space compactly accommodates the roof part or the roof parts arranged stacked therein so that due to the reduced space requirement, the possibilities for movement and storage on the body for the movable and storable roof parts are improved. The roof part may be formed in different ways, for example by a folding roof, a shade roof or a solid roof element, or the motor vehicle roof is a louvered roof with several louvers as the roof parts.

Feasibly, the roof parts together with the movable roof unit or the movable rear unit, may be moved into the storage position. Thus, the roof parts are first transferred to a storage space which is advantageously arranged under structural or formal boundary conditions. The storage space is then moved with the roof unit or rear unit which contains it when the roof is being lowered to the final storage position for the roof parts.

According to one advantageous embodiment, the roof parts, together with the movable roof unit or the movable rear unit, may be moved into the storage position.

In one embodiment, the storage space for the roof parts is located preferably on the roof cassette, the rear element or the rear door.

The roof unit may preferably be a roof cassette which forms a rear roof section and which contains the storage space for the roof parts which are stacked.

According to another advantageous embodiment of the present invention, the side roof member located in front of the roof unit or the roof cassette is moved by a bearing means laterally next to or to under the roof cassette when the roof is being opened.

The rear unit preferably includes a rear element which extends over the width of the motor vehicle and/or two lateral rear columns.

According to one embodiment, the roof cassette is supported on a motor vehicle side part by a lateral rear column which is hinged on the roof cassette, and when the roof cassette is being lowered, is swivelled into a side horizontal position.

To attain the above, the lateral rear column is preferably movably supported on its lower end on a guideway on the side part of the motor vehicle.

Preferably, the roof cassette is movably supported by a front rod on the side part of the motor vehicle and the front rod, together with the rear column, forms a four-bar mechanism by which the roof cassette can be lowered into the storage position, especially in a horizontal alignment.

The roof part or the roof parts can be accommodated, stacked in a rear door according to one advantageous embodiment, and the rear element which has one rear column, and one top rear transverse part at a time is, on the one hand, pivotally attached via the rear column to the body, and on the other hand, is hinged to the side roof member.

The side roof member on the rear element is supported in a joint which guides the side roof member to the outside when the rear element is being swivelled forward, and at the same time, swivels it down, the support on the other end of the side roof member enabling a swivelling-sliding motion.

The roof part or roof parts may be accommodated stacked in a rear door according to one advantageous embodiment and the roof unit is a roof cassette which forms the rear roof section. Furthermore, the side roof member which is located in front of the roof cassette when the roof is being opened, may be moved to under the roof cassette by a bearing means. Finally, the lateral rear column supports the roof cassette on the side part of the motor vehicle which is hinged to the roof cassette, and is swivelled into a lateral horizontal position when the roof cassette is being lowered.

The lateral rear column or the rear element is movably supported on its bottom end on or in a guideway on the motor vehicle side part.

The roof cassette is movably supported by a front rod on the motor vehicle side part, and the front rod, together with the rear column, forms a four-bar mechanism by which the roof cassette can be lowered into the storage position, especially in a horizontal alignment.

Preferably, the side roof member which is located in the lengthwise direction of the motor vehicle in front of the roof unit or the roof cassette when the roof is being opened, is located laterally on the roof cassette by the bearing means.

The lateral rear column supports the roof cassette on a motor vehicle side part. It is hinged on the roof cassette and swivels when the roof cassette is being lowered into a lateral horizontal position.

The lateral rear column is preferably movably supported on its bottom end on, or in, a guideway on the motor vehicle side part.

These and other objects, features and advantages of the present invention will become more apparent from the following detailed description of the invention when viewed in conjunction with the accompanying drawings.

BRIEF DESCRIPTION OF THE DRAWINGS

FIGS. 2.1 to 2.3 each show a perspective rear view of a first embodiment of the convertible roof in different positions of motion when being stored;

FIGS. 3.1 to 3.3 each show a perspective rear view of a second embodiment of the convertible roof in different positions of motion when being stored;

FIGS. 4.1 to 4.3 each show a perspective rear view of a third embodiment of the convertible roof in different positions of motion when being stored;

FIGS. 5.1 to 5.6 each show an angled side view of another embodiment of the convertible roof in different positions of motion when being stored;

FIGS. 6.1 to 6.5 each show an angled side view of another embodiment of the convertible roof in different positions of motion when being stored;

FIG. 18 shows a schematic side view of yet another embodiment of the convertible roof in the converted stored position;

FIGS. 18.1 to 18.3 each show a schematic side view of one embodiment of the convertible roof, FIG. 18.1 and 18.2 showing the storage space for louvered roof parts of a louvered roof when the roof is in a closed configuration while FIG. 18.3 shows the same embodiment with the storage space containing the motor vehicle roof;

FIGS. 20.1 to 20.3 each show a schematic side view of another embodiment of the convertible roof, FIG. 20.1 and 20.2 showing the storage space for louvered roof parts of a louvered roof when the roof is in a closed configuration while FIG. 20.3 shows the same embodiment with the storage space containing the motor vehicle roof;

FIGS. 21.1 to 21.3 each show a schematic side view of still another embodiment of the convertible roof, FIG. 21.1 and 21.2 showing the storage space for louvered roof parts of a louvered roof when the roof is in a closed configuration while FIG. 21.3 shows the same embodiment with the storage space containing the motor vehicle roof;

FIGS. 24.1 and 24.2 each show a schematic side view of one embodiment of the convertible roof, FIG. 24.1 showing the storage space for louvered roof parts of a louvered roof while FIG. 24.2 shows the same embodiment with the motor vehicle roof in an opened configuration;

FIGS. 25.1 and 25.2 each show a schematic side view of another embodiment of the convertible roof, FIG. 25.1 showing the storage space for louvered roof parts of a louvered roof while FIG. 25.2 shows the same embodiment with the motor vehicle roof in an opened configuration;

FIGS. 26.1 and 26.2 each show a schematic side view of still another embodiment of the convertible roof, FIG. 26.1 showing the storage space for louvered roof parts of a louvered roof while FIG. 26.2 shows the same embodiment with the motor vehicle roof in an opened configuration;

FIGS. 28.1 and 28.2 each show a schematic side view of another embodiment of the convertible roof, FIG. 28.1 showing the storage space for louvered roof parts of a louvered roof while FIG. 28.2 shows the same embodiment with the motor vehicle roof in an opened configuration.

DETAILED DESCRIPTION OF THE INVENTION

Figure 1:
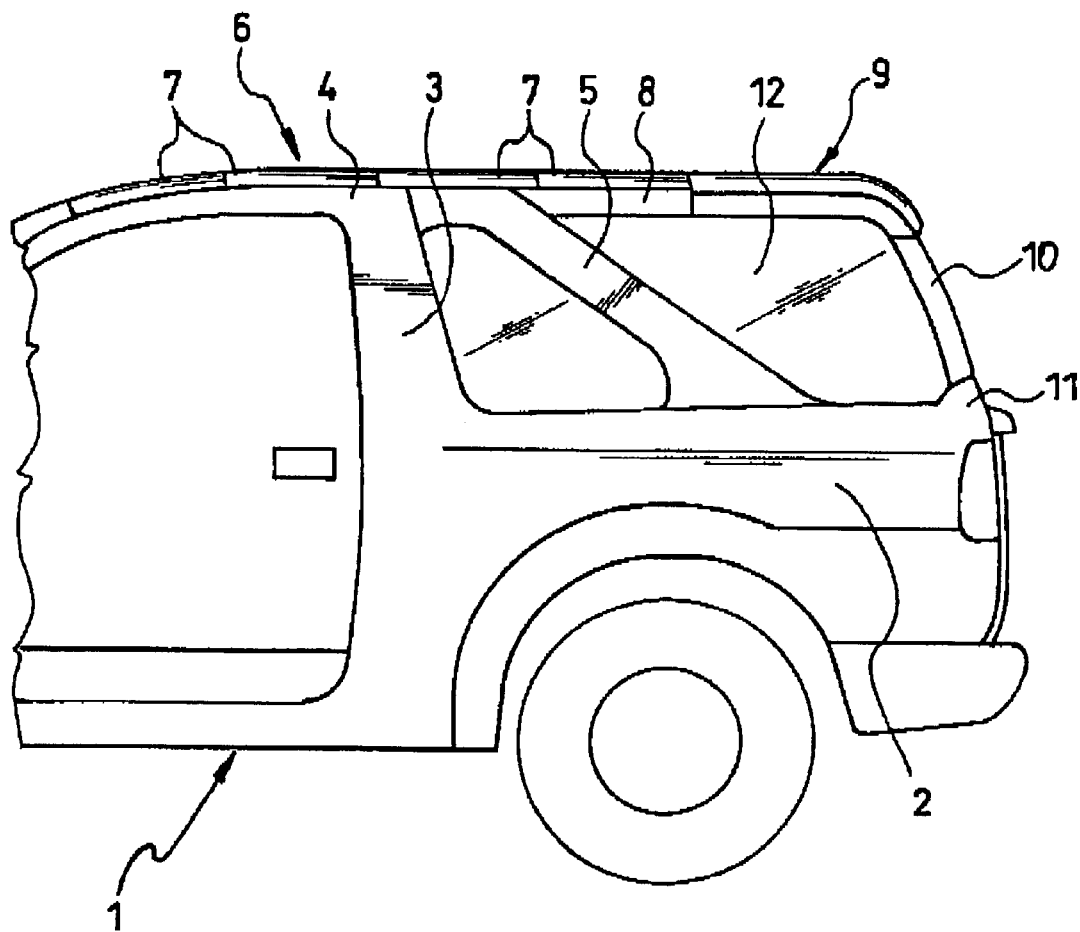
FIG. 1 shows a schematic side view of a motor vehicle with a convertible motor vehicle roof in accordance with one embodiment of the present invention.

FIG. 1 shows a motor vehicle such as a station wagon or a general purpose vehicle with a fastback contains a body 1 with a rear fixed motor vehicle side part 2 which is located on each side of the vehicle and which extends from the B column 3 to the rear towards the back of the motor vehicle. The front fixed side roof member 4 extends as far as the body-mounted C column 5. The motor vehicle roof 6 to be opened contains a louvered roof with several movable louvered roof parts 7 which are made as solid, openable roof parts and which in the closed position of the motor vehicle roof 6, are located behind one another. The movable louvered roof parts 7 are movably supported laterally toward the front by the fixed side roof member 4 and toward the rear by movably supported side roof member 8. The rear section of the motor vehicle roof 6 is formed by a roof cassette 9 which adjoins the two movable side roof members 8 and is supported via a rear unit in the form of the two lateral rear columns 10 on the back end 11 of the rear fixed side parts 2. The rear unit can also be a rear element which extends over the width of the motor vehicle.

The rear side window 12, with the motor vehicle roof 6 closed tightly, adjoins the rear side roof member 8, the roof cassette 9, and the lateral rear column 10. The rear side window 12 may be lowered or otherwise removed from this position into the side part 2 when the motor vehicle roof 6 is to be opened and converted and the elements of the roof 6 are lowered into the storage position.

Since the motor vehicle and the motor vehicle roof 6 are made largely symmetrical with respect to the vertical middle lengthwise plane of the motor vehicle, the motor vehicle roof is illustrated and described simply using the motor vehicle side or motor vehicle half as shown.

To open the roof opening 13 in the manner shown in FIGS. 2.1 to 2.3, the louvered roof parts 7 are pushed on lateral guides (not shown) by a drive into the roof cassette 9 as shown in FIG. 2.1, and stored stacked on top of one another therein. To convert the motor vehicle roof 6, after the lowering of the rear window and side windows 12 (not shown), the side roof member 8 is pushed laterally next to the roof cassette 9 by a mechanism which is formed, for example, in the manner of a sliding door mechanism. In this regard, after releasing the connection to the front side roof member 4, a cable drive (not shown) driven by an electric motor may be used to execute the displacement motion of the side roof member 8.

The rear column 10 which is pivotally mounted on the roof cassette 9 via a joint 14 around a transverse axis, is movably supported on its lower end by rod 15 in a guideway 16 located on the side part 2. The roof cassette 9 is also pivotally mounted on the C column 5 via a front rod 17 which is pivotally mounted both on the roof cassette 9, and also on the C column 5. To lower the roof cassette 9, the rod 15 is pushed forward (toward the front of the vehicle) in the guideway 16 and is fixed in the front end position 18 such that the rear column 10 is located in the swivel position which forms a four-bar mechanism which consists of a front rod 17 and a rear column 10 with its rod 15 as shown in FIG. 2.2.

The four-bar mechanism which is moved via the drive means swivels the roof cassette 9 by the intended swivelling movements of the front rod 17 and the rear column 10 with its rod 15 into the horizontal storage position in or on the trunk compartment.

Conversion of the motor vehicle roof 6 in the closing process takes place in the opposite sequence of motions.

Various other embodiments of a convertible motor vehicle roof are described herein below, common reference numerals being used for similar features in the various embodiments to facilitate understanding. A second embodiment of a convertible motor vehicle roof 6 is shown in FIGS. 3.1 to 3.3 that contains, instead of the above described roof cassette 9, a rear element 19 which has a top rear transverse part 21 which joins two rear columns 20, only one being shown. The rear element 19 is movably connected by a joint mechanism 22 to the side roof member 8. The movable side roof member 8 on its front end, has an attached rod 23 which is supported on the side roof member 4 or on the C column 5 so that it is able to swivel and move translationally. The rear element 19 is furthermore mounted by means of a joint 24 which is attached to the back end of the rear column 20 on the back end 11 of the fixed side part 2 to be able to swivel essentially around the transverse axis of the motor vehicle.

When the motor vehicle roof 6 is opened and converted, the louvered roof parts 7 are pushed on lateral guides (not shown) into a rear door 25 and held therein in the storage position in a stacked arrangement. After the lowering of the rear window and the side windows 12 (not shown), the side roof member 8 is swivelled out of the fixed arrangement on the rear element shown in FIG. 3.1 via the joint mechanism 22 on its back end, into a position, for example, next to the rear element 19 so that the rear element 19 can be swivelled around the joint 24 and forward into the trunk compartment. In doing so, the side roof member 8 which is entrained via the joint mechanism 22, is swivelled via its rod 23 relative to the fixed side roof member 4 into a position along the C column 5 as shown in FIG. 3.3. The rod 23 can execute the required translational compensation motion on its support on the side roof member 4, on the movable side roof member 8, or by a telescoping configuration.

In a third embodiment shown in FIGS. 4.1 to 4.3 which represents a modification of the first embodiment, the louvered roof parts 7 are pushed into the rear door 25 and accommodated therein in the storage position in a stacked arrangement. The movable side roof member 8 is pushed into the roof cassette 9 by a mechanism which can also be formed, for example, in the manner of a sliding door mechanism after releasing the connection to the front side roof member 4. The mechanism may have a cable drive (not shown) driven by an electric motor to allow execution of the displacement motion.

According to a fourth embodiment as shown in FIGS. 5.1 to 5.6, the motor vehicle roof 6 which has been modified relative to the aforementioned embodiments contains a rear movable side roof member 26 which extends as far as the top end of the lateral rear column 10 in the closed position of the motor vehicle roof 6 in the manner shown in FIG. 5.1. The roof cassette 9 is located between the two side roof members 26 which are laterally opposite one another and the roof cassette 9 is supported via a rod arrangement 27 on the respective side part 2 of the body. The rod arrangement 27 contains a front four-bar mechanism with a first rod 28 and a second rod 29 which on the one hand, are supported in swivel joints 30 and 31 on the side part 2, and on the other hand are pivotally connected to the connecting rod 32 which in turn, is pivotally connected on its other end via a joint 33 to the roof cassette 9, for example, on its front section.

The rod arrangement 27 further contains a rear, roughly L-shaped rod 34 which is pivotally mounted in a joint 35 on the side part 2 and is connected via a coupling rod 36 to the rod 29 of the front four-bar mechanism, and is also connected to the rear column 10 via a rod 37 which is rigidly attached to the rear column 10. The rear column 10 contains, on its top end, a permanently attached rod 38 which is clearly shown in FIG. 5.2 which is coupled in a joint 39 to the rear section of the roof cassette 9 as shown in FIG. 5.3.

The side roof member 26 is supported laterally on the roof cassette 9 or on the rods 32 and 38. The support is attained, for example, via a four-bar mechanism (not shown) located in the plane which is tilted to the roof cassette 9 that acts to swivel the side roof member 26 to the outside and down relative to the roof cassette 9 when the roof cassette 9 is being lowered. The four-bar mechanism may be coupled to the rod arrangement 27 for executing its motion or can be driven by its own drive.

When the motor vehicle roof 6 is being opened and converted, the louvered roof parts 7 are first moved into or under the roof cassette 9 as shown in FIG. 5.1. By swivelling the front four-bar mechanism, for example, by a hydraulic cylinder which engages the rod 28 or the rod 29 and correspondingly, the coupling rod 32 and the rear column 10 which is coupled to it, the roof cassette 9 is lowered through the intermediate positions shown in FIGS. 5.2 to 5.5 into the storage position as shown in FIG. 5.6. In doing so, the side roof member 26 is initially decoupled from the front fixed side roof member 4, and then swivelled out and down around the lengthwise axis such that the front end of the side roof member 26 is lowered inwardly of the C column.

The side separating line which runs in the preceding embodiment of FIGS. 4.1 to 4.3 between the side roof member 8 and the roof cassette 9 in the transverse plane is eliminated in this embodiment shown in FIGS. 5.1 to 5.6 in which the side roof member 26 runs along the roof cassette 9 and the separating line is thus located in the lengthwise plane in a continuation of the lengthwise line on the roof section formed by the louvered roof parts 7.

An embodiment which has been modified relative to the above described embodiment is shown in FIGS. 6.1 to 6.5.

The rod arrangement 27 likewise contains the front four-bar mechanism with the first rod 28 and the second rod 29 in the described arrangement. The rod arrangement 27 furthermore contains a rear four-bar mechanism with a first rod 40 and a second rod 41 which on the one hand, are supported in swivel joints 42 and 43 on the side part 2, and on the other hand, are pivotally connected to the coupling rod 44 which in turn is pivotally coupled on its other end via a joint 45 to the rear column 10. The rear column 10 is in turn, coupled via attached rod 38 and joint 39 to the rear section of the roof cassette 9 as shown in FIG. 6.2. The coupling rod 46 is attached to the rod 29 of the front four-bar mechanism and is pivotally coupled to a coupling section 47 of the first rod 40 of the rear four-bar mechanism via joint 48.

Opening and converting the motor vehicle roof 6 take place in a similar way as the previous embodiments, by swivelling the front or the rear four-bar mechanism, for example, by a hydraulic cylinder, which engages one of the respective rods. The swiveling motion is initiated and the roof cassette 9 is lowered through the intermediate positions shown in FIGS. 6.2 to 6.4 into the storage position as shown in FIG. 6.5.

FIGS. 7 to 17 each show various embodiments of the motor vehicle roof 6 each in their converted open position and are each discussed briefly below.

Figure 7:
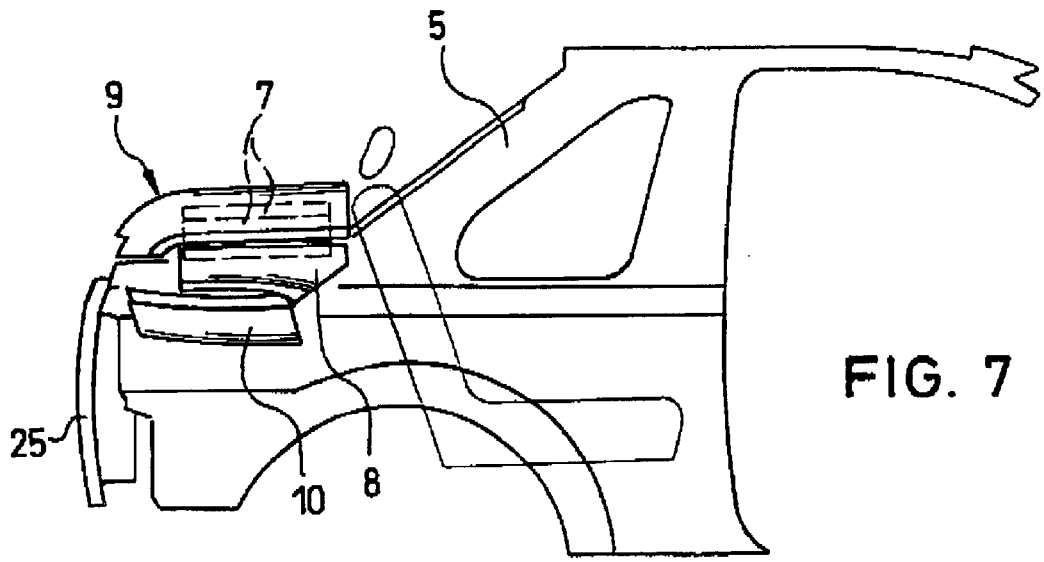
FIG. 7 shows a schematic side view of another embodiment of the convertible roof in the converted stored position.

FIG. 7 shows one embodiment which is similar to the embodiment shown in FIGS. 2.1 to 2.3. The louvered roof parts 7 are moved into the roof cassette 9. The side roof member 8 is folded under the roof cassette 9. The rear column 10 which is connected to the roof cassette 9, is lowered under the roof cassette 9 via the lowering motion of the roof cassette 9. The roof cassette 9 is stored with the side roof member 8 and the rear column 10 over the trunk compartment. According to one version, the side roof member 8 is placed laterally against the roof cassette 9 in accordance with the embodiment shown in FIGS. 2.1 to 2.3. Advantages of this embodiment include a very compact arrangement of the stored roof without adversely affecting the back seats, good trunk accessibility, protection of the trunk compartment by the roof cassette, and the possibility of using conventional rear doors.

Figure 8:
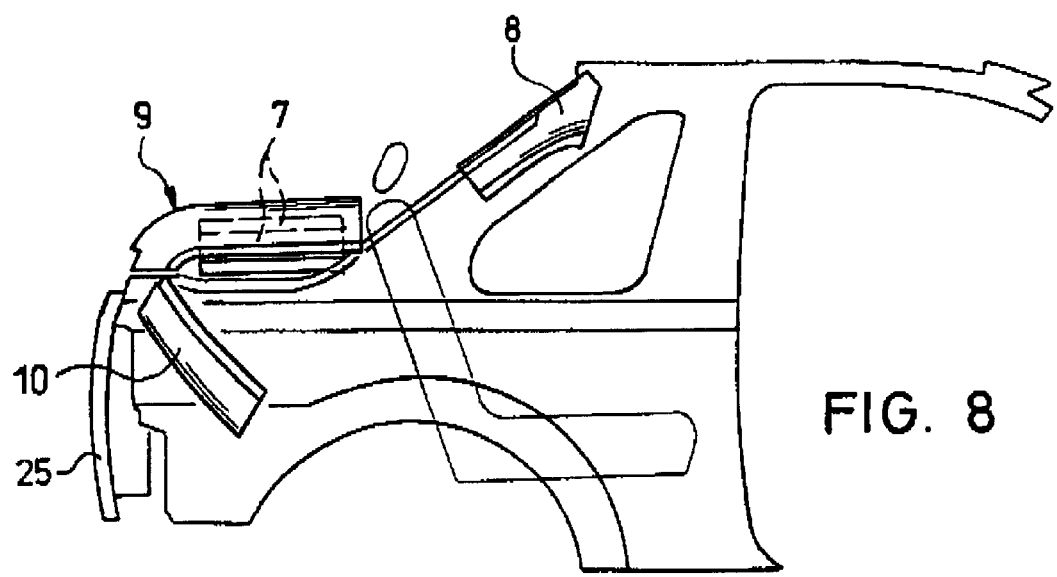
FIG. 8 shows a schematic side view of still another embodiment of the convertible roof in the converted stored position.

FIG. 8 shows one embodiment in which the louvered roof parts 7 are moved into the roof cassette 9, and the rear column 10 which is connected to the roof cassette 9 is lowered into the side space of the trunk compartment via the lowering motion of the roof cassette. The roof cassette 9 is stored over the trunk compartment, while the side roof member 8 is swivelled to the C column. Advantages of this embodiment include good trunk compartment accessibility, protection of the trunk compartment by the roof cassette, and the possibility of using a conventional rear door.

Figure 9:
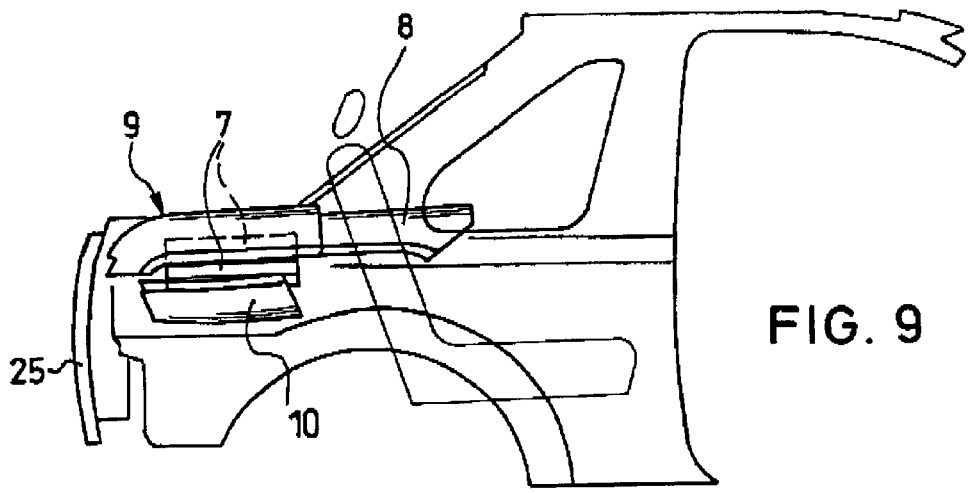
FIG. 9 shows a schematic side view of yet another embodiment of the convertible roof in the converted stored position.

FIG. 9 shows one embodiment in which the louvered roof parts 7 are moved into the roof cassette 9 and the side roof member 8, in its original arrangement on the roof cassette 9, remains connected to it. The rear column 10 is folded under the roof cassette 9. The roof cassette 9 is then stored over the trunk compartment. This embodiment has the advantage that the roof cassette 9 and the side roof member 8 form a unit which need not be separated. In addition, this embodiment also has the advantage that the trunk compartment has good accessibility, that the trunk compartment is protected by the roof cassette and that there is the possibility of using a conventional rear door or a production rear door. According to one version, the rear column 10 is connected to the roof cassette 9 such that the rear column 10 is stored under the roof cassette 9 via the lowering motion of the roof cassette 9.

Figure 10:
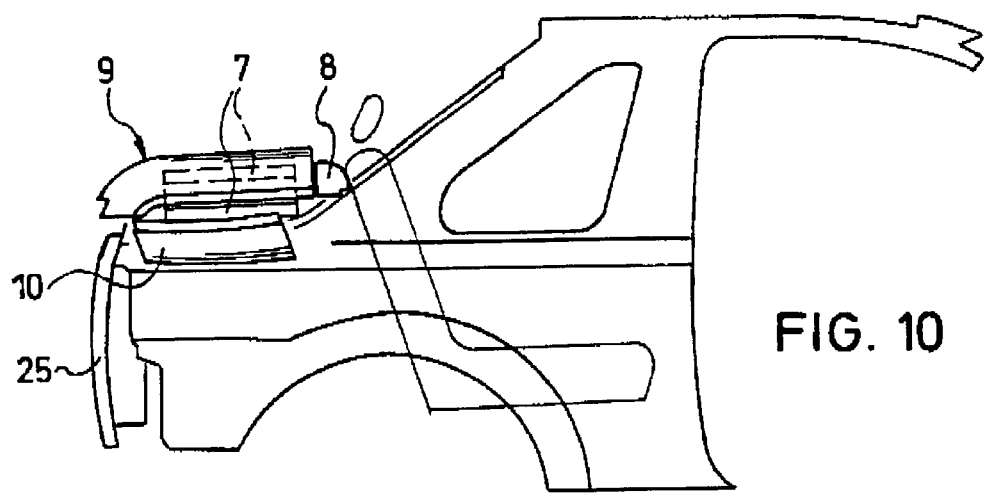
FIG. 10 shows a schematic side view of another embodiment of the convertible roof in the converted stored position.

In the embodiment shown in FIG. 10, the louvered roof parts 7 are also moved into the roof cassette 9. The side roof member 8 is folded inwardly to the front of the roof cassette 9 in a transverse alignment and the rear column 10 is folded under the roof cassette 9. The roof cassette 9 is then stored with the folded-on parts 8 and 10 over the trunk compartment. This embodiment has the advantage of a compact arrangement. Furthermore, the back seats are not adversely affected, the trunk compartment is easily accessible and protected by the roof cassette, a production rear door can be used, and there are no collision problems between the side roof member 8 and the rear column 10 in the folded-in state. According to one version, the rear column 10 is connected to the roof cassette 9 such that the rear column 10 is stored under the roof cassette 9 via the lowering motion of the roof cassette 9.

Figure 11:
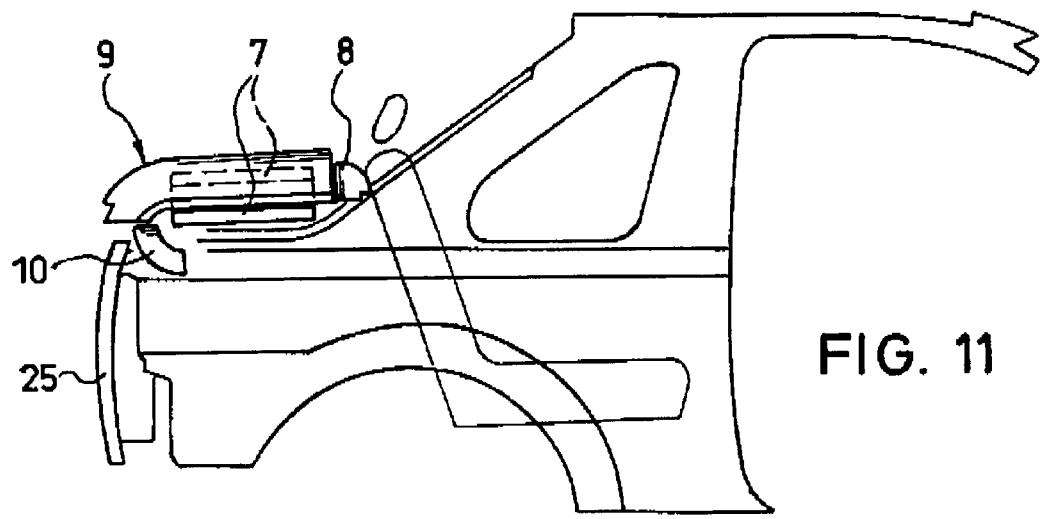
FIG. 11 shows a schematic side view of still another embodiment of the convertible roof in the converted stored position.

The embodiment shown in FIG. 11 is a modification of the embodiment shown in FIG. 10. In contrast to the embodiment of FIG. 10, the shown embodiment of FIG. 11 contains a rear column 10 which is folded inwardly under the roof cassette 9 in a transverse alignment. Advantages include a compact arrangement, no adverse affect on the back seats, protection of the trunk compartment by the roof cassette 9, using a production rear door, a connection between the roof cassette 9 and the side roof member 9, and no possibility of collision between the side roof member 8 and the rear column 10.

Figure 12:
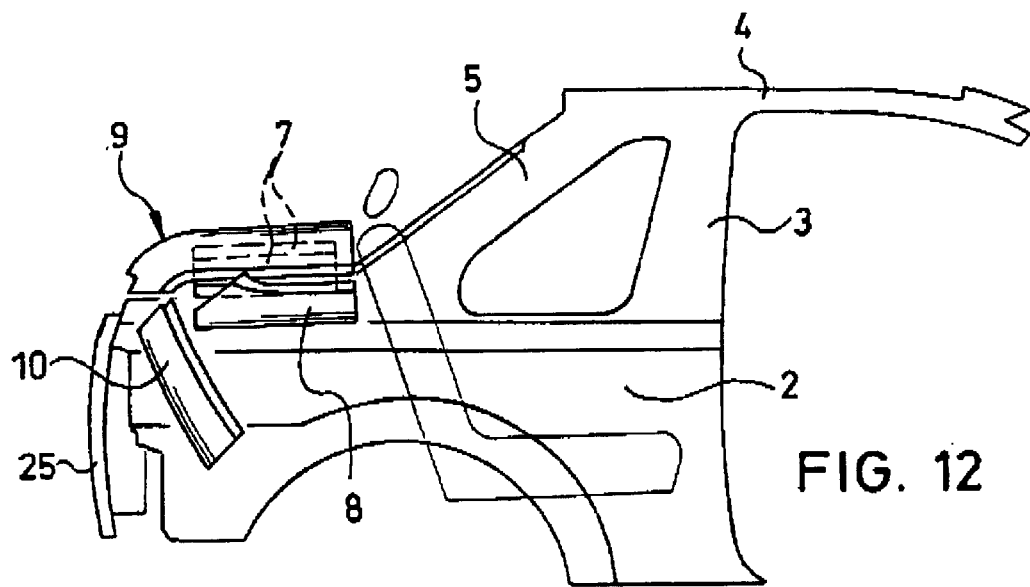
FIG. 12 shows a schematic side view of another embodiment of the convertible roof in the converted stored position.

The embodiment shown in FIG. 12 is a modification of the embodiment shown in FIG. 8. In contrast to the embodiment of FIG. 8, the shown embodiment of FIG. 12 contains a side roof member 8 which is placed underneath against the roof cassette 9. Alternatively, the side roof member 8 may be placed laterally against the roof cassette 9. In this way, there is no adverse affect on the back seats, the trunk compartment is protected by the roof cassette 9, there is good accessibility of the trunk compartment, a production rear door can be used, and there is no possibility of collision between the side roof member 8 and the rear column 10.

Figure 13:
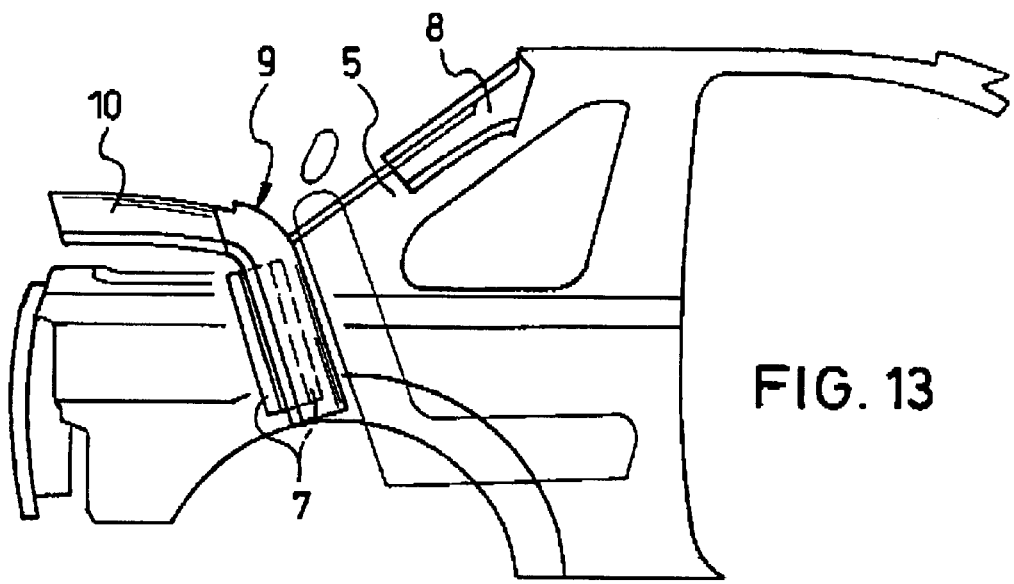
FIG. 13 shows a schematic side view of yet another embodiment of the convertible roof in the converted stored position.

In the embodiment shown in FIG. 13, the louvered roof parts 7 are moved into the roof cassette 9. The side roof member 8 is swivelled inwardly to the C column and the roof cassette 9, which is rigidly connected to the rear column 10, is folded forward into the trunk compartment so that in the stored position, it is located behind the rear seatbacks. This embodiment offers good accessibility to the trunk compartment and a production rear door can be used. Finally the roof cassette 9 and the rear column 10 can remain joined.

Figure 14:
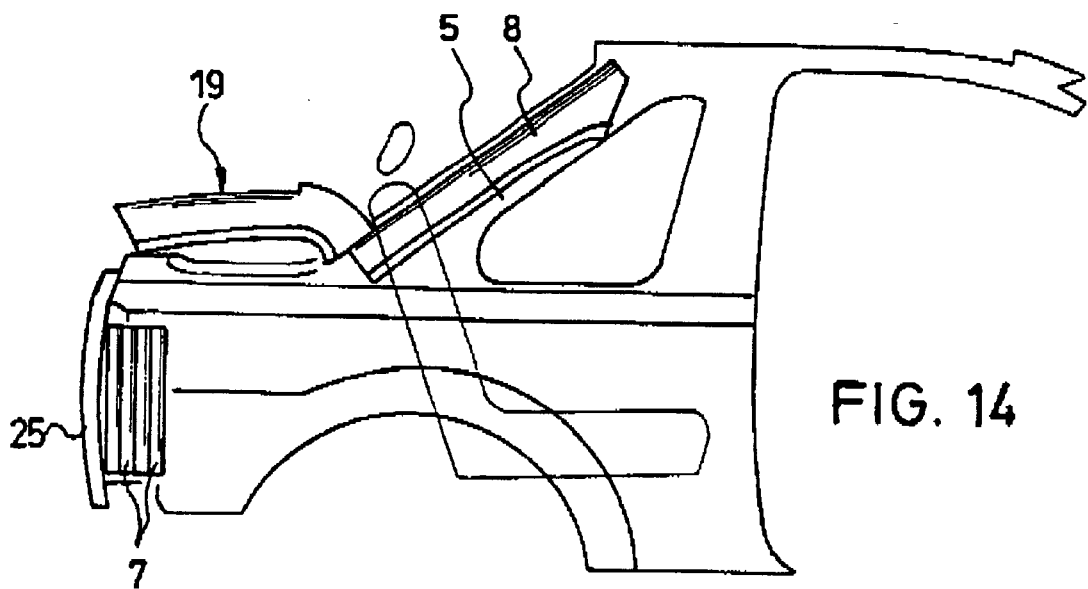
FIG. 14 shows a schematic side view of another embodiment of the convertible roof in the converted stored position.

FIG. 14 shows the embodiment shown in FIGS. 3.1 to 3.3 in the open stored position in which the louvered roof parts 7 are moved into the rear door 25, and instead of the roof cassette 9, there is rear element 19 with the two rear columns 20 and the connecting top rear transverse part 21. The long side roof member 8 is swivelled on or into the C column 5 and the rear element 19 is folded forward over the trunk compartment. This embodiment provides good trunk compartment accessibility, a large volume of the trunk compartment, and few roof elements.

Figure 15:
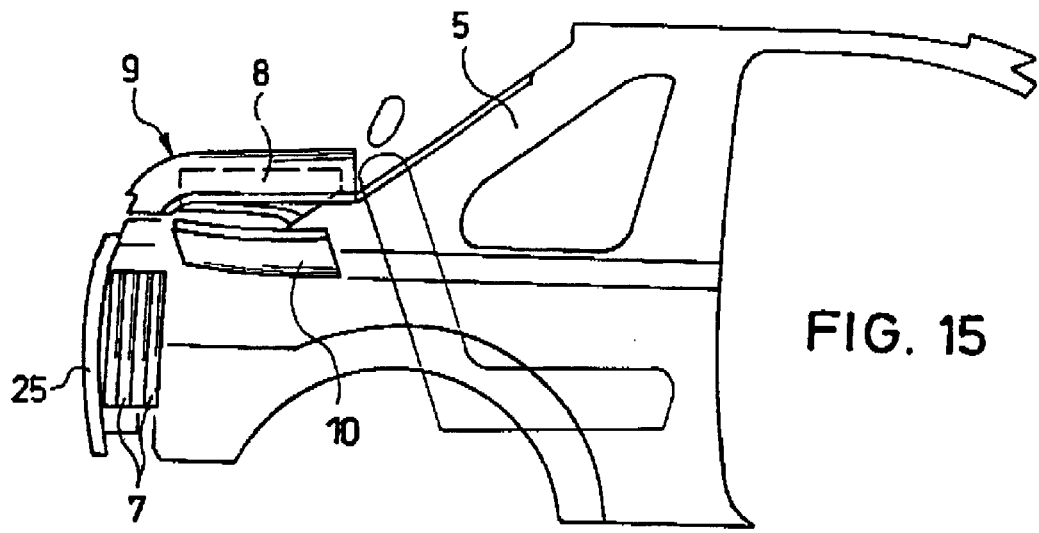
FIG. 15 shows a schematic side view of still another embodiment of the convertible roof in the converted stored position.

In the embodiment shown in FIG. 15, the louvered roof parts 7 are moved into the rear door 25, the side roof member 8 is stored in the roof cassette 9 and the rear column 10 is folded under the roof cassette 9. The roof cassette 9 is then stored with the side member 8 and the rear column 10 over the trunk compartment. In one version, the rear column 10 is connected to the roof cassette 9 by a joint connection which lowers the rear column 10 to under the roof cassette 9 by the lowering motion of the roof cassette 9. Advantages of this embodiment include a very compact arrangement of the stored roof without adversely affecting the back seats, good trunk compartment accessibility, protection of the trunk compartment by the roof cassette, and low weight of the roof cassette 9 since the roof louvers 7 are stored in the rear door 25.

Figure 16:
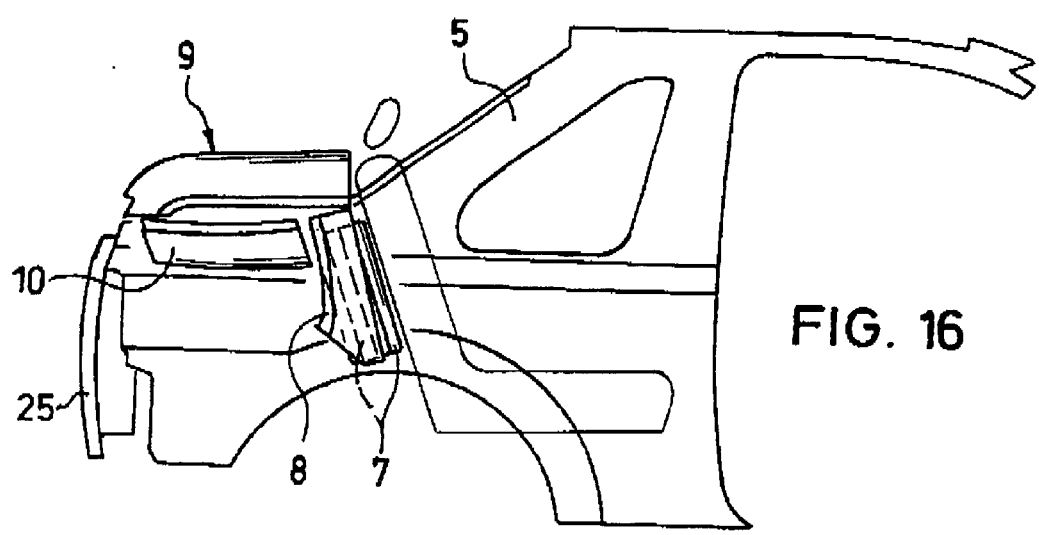
FIG. 16 shows a schematic side view of another embodiment of the convertible roof in the converted stored position.

In the embodiment shown in FIG. 16, the louvered roof parts 7 are moved via guides (not shown) to a position behind the rear seatbacks into a storage space in which they are located in the upright position. The side roof member 8 is folded laterally to the front end of the roof cassette 9 roughly in the upright alignment of the louvered roof parts 7. The rear column 10 is connected to the roof cassette 9 and is stored under the roof cassette 9 via the lowering motion of the roof cassette 9. The roof cassette 9 is stored over the trunk compartment with the parts folded. In one version, the rear column 10 is folded under the roof cassette 9 and is stored with it. Advantages of this embodiment include low weight of the roof cassette 9, no adverse affect on the back seats since the louvered roof parts 7 are stored in the rear door 25, good accessibility of the trunk compartment, protection of the trunk compartment by the roof cassette, and the possibility of using a production rear door.

Figure 17:
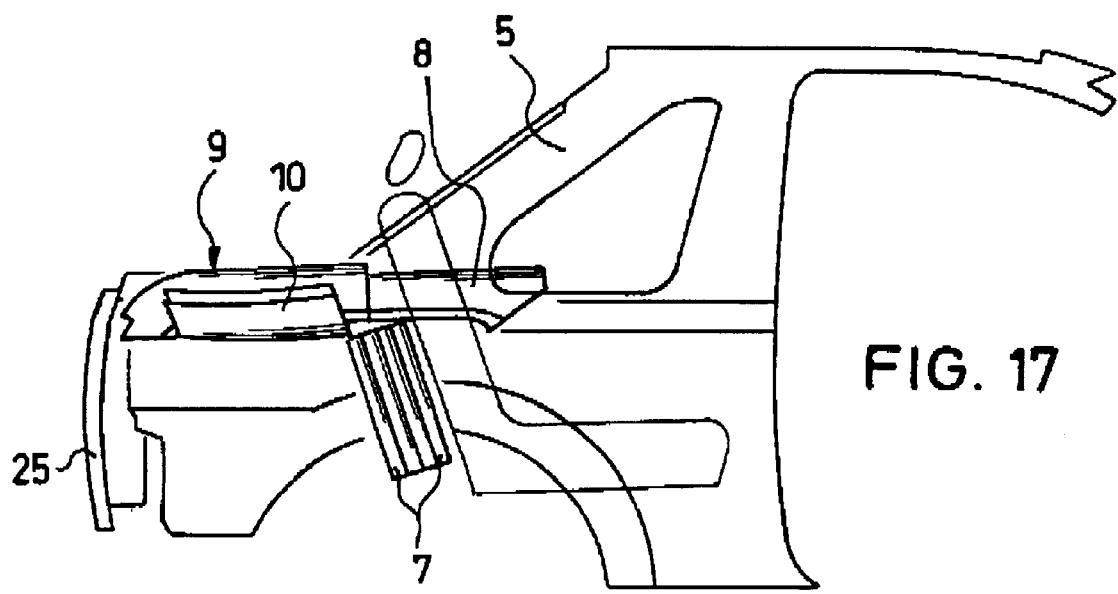

FIG. 17 shows an embodiment in which the louvered roof parts 7 are likewise located behind the rear seatbacks in the upright position. The side roof member 8 remains securely joined to the roof cassette 9 and the rear column 10 is folded under or laterally next to the roof cassette 9. The roof cassette 9 is stored with the parts folded over the trunk compartment. In one version, the rear column 10 is connected to the roof cassette 9 by a joint connection which lowers the rear column 10 under or laterally next to the roof cassette 9 by the lowering motion of the roof cassette 9. This embodiment offers good trunk compartment accessibility, the trunk compartment is protected by the roof cassette, and a production rear door can be used. Finally, the roof cassette 9 and the side roof member 8 can remain joined to one another in the original alignment.

The storage space for the louvered roof parts 7 on the roof cassette 9 is bounded in one embodiment shown in FIGS. 18.1 to 18.3 by a variable bottom part 50 which is shifted down via a scissors mechanism 51 from its neutral position on a top holder 52, against the force of a tension spring 53 in order to open the storage space 29 to the size necessary for accommodating the louvered roof parts 7. The louvered roof parts 7 are moved via a guide rail 54 on the front fixed side roof member 4 or via a guide rail 55 on the rear side roof member 8 and via a feed 56 into the storage space.

Figure 19:
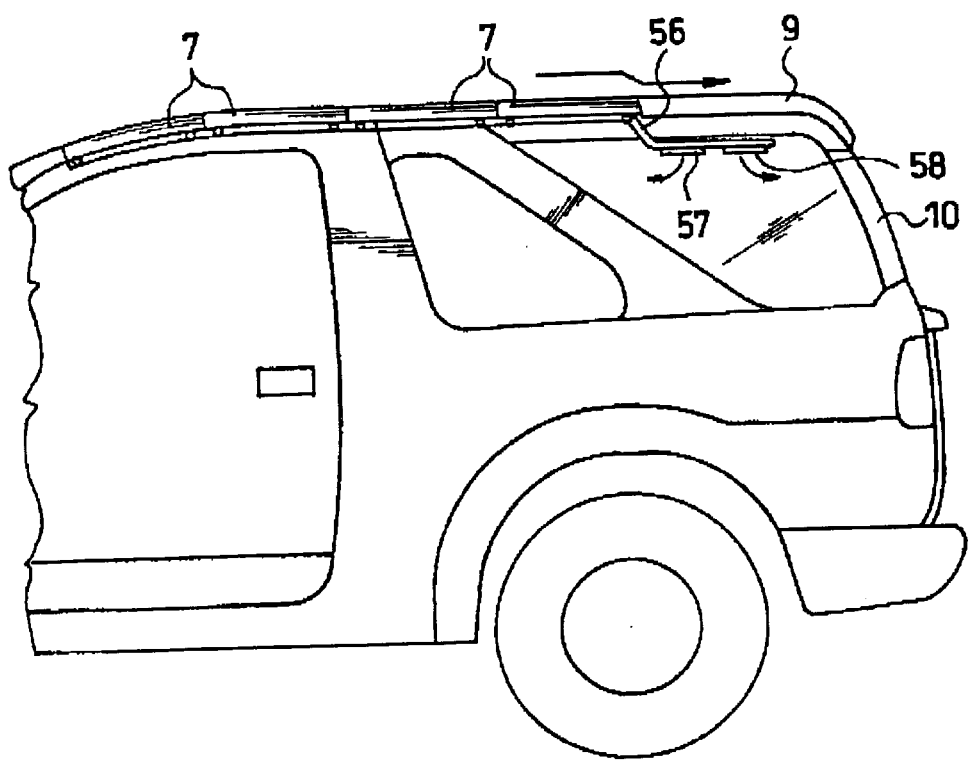
FIG. 19 shows a schematic side view of one embodiment of the convertible roof with the storage space for louvered roof parts of a louvered roof when the roof is in a closed configuration.

The storage space shown in FIG. 19 is formed by two rails 57 and 58 which can be folded down out of their horizontal arrangement to an angled or vertical arrangement on the feed 56 for the louvered roof parts 7 and thus, form the storage space.

FIGS. 20.1 to 20.3 show a storage space which is located on the rear element 10 which is formed like the storage space of FIG. 18. The storage space includes a movable bottom part 50 which is shifted to the inside from its neutral position on a holder 52 via the scissors mechanism 51, the holder 52 being mounted on the rear element 10 against the force of a tension spring 53. The louvered roof parts 7 are moved via the feed 56 into the storage space and are accommodated therein in an essentially upright and stacked arrangement shown in FIG. 20.3.

The storage space can be located in or behind a rear door 59 as well as shown in FIGS. 21.1 to 21.3. The louvered roof parts 7 are moved via the feed 56 which is elongated downward into the storage space and are accommodated therein in an essentially vertical and stacked arrangement as shown in FIG. 21.3. As in the preceding example, the storage space is formed with a variable, movable bottom part 50.

Figure 22:
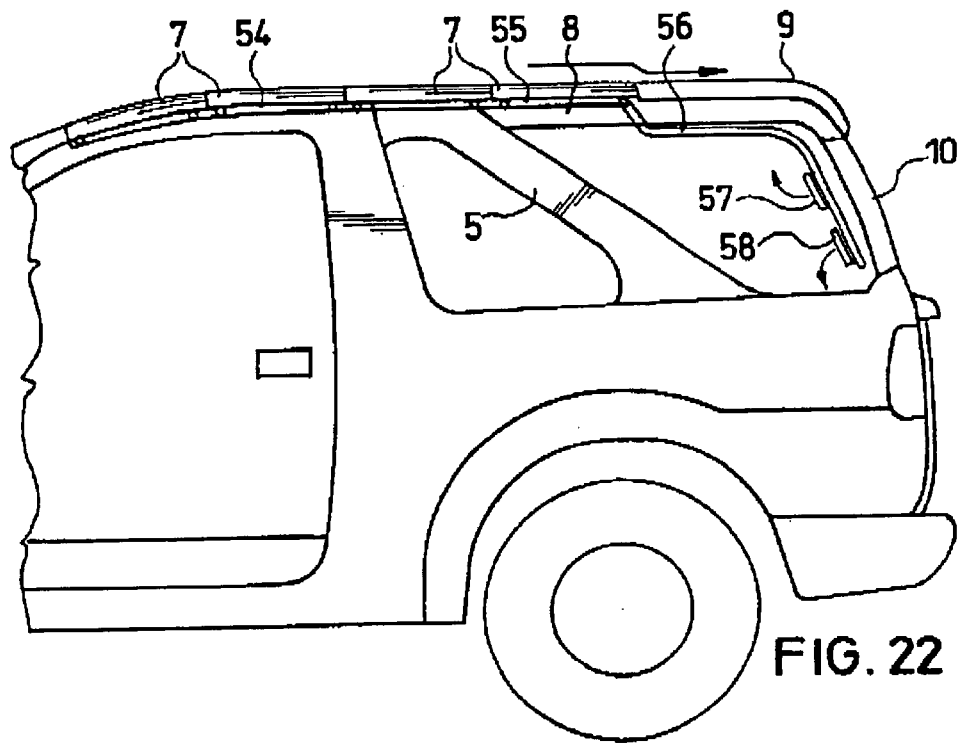
FIG. 22 shows a schematic side view of one embodiment of the convertible roof with the storage space for louvered roof parts of a louvered roof when the roof is in a closed configuration.
Figure 23:
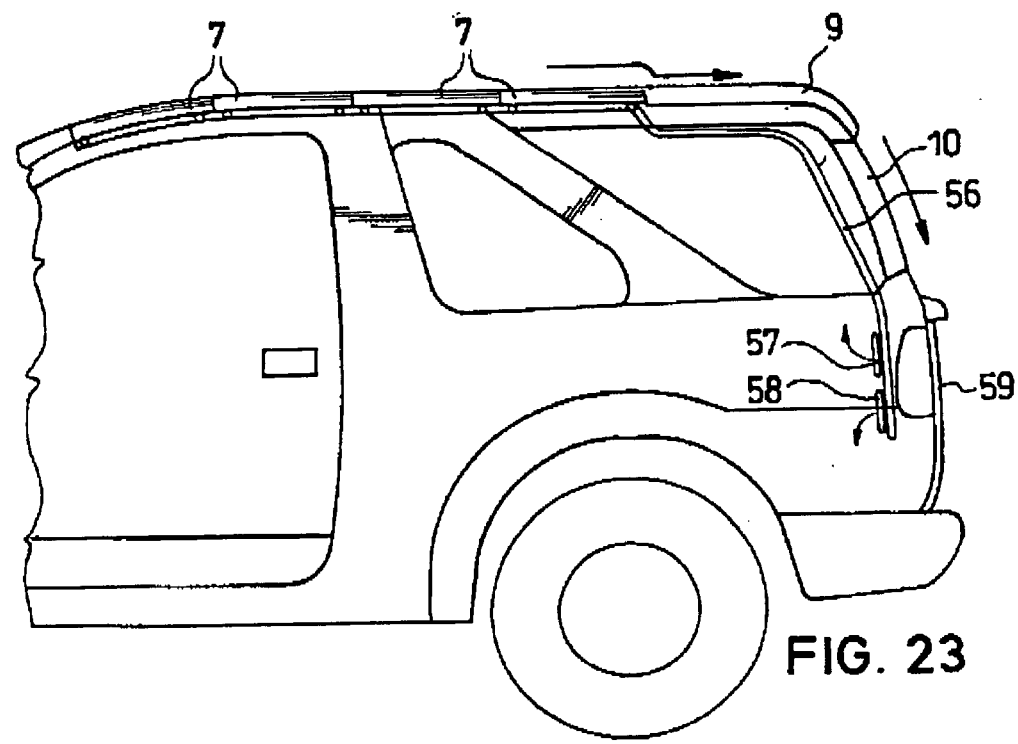
FIG. 23 shows a schematic side view of another embodiment of the convertible roof with the storage space for louvered roof parts of a louvered roof when the roof is in a closed configuration.

Furthermore, the storage space which is formed as shown in FIG. 19 with two folding rails 57 and 58 can be located on the rear element 10 as shown in FIG. 22, or on the rear door 59 as shown in FIG. 23.

FIG. 24.1 shows one embodiment of the roof in which the stacked louvered roof parts 7 are located on the roof cassette 9. The roof cassette 9 is rigidly connected to the rear element 10 which is movably supported on the guide rails 60 located in the rear area of the body. The roof cassette 9 is lowered as a unit with the rear element 10 and the side roof member 8 as shown in FIG. 24.2.

FIG. 25.1 shows one embodiment of the roof in which the roof cassette 9 and the side member 8 form a unit and are movably supported via a four-bar mechanism with a first rod 61 and a second rod 62 on the C column. The roof cassette 9 contains the storage space for the louvered roof parts 7 and is connected to the rear element 10 via a swivel joint 63. The rear element 10 is movably supported on its lower end in a curve-shaped guide rail 64. To lower the roof cassette 9 the rear element 10 is swivelled forward with a lower bearing 65 along the guide rail 64 and is lowered together with the roof cassette 9 and the side roof member 8 in the manner shown in FIG. 25.2.

FIG. 26.1 shows one embodiment of the roof which is similar to the above described embodiment, but which contains the storage space for the louvered roof parts 7 in or behind the rear door 59. Lowering takes place in a similar manner as shown in FIG. 26.2.

Figure 27:
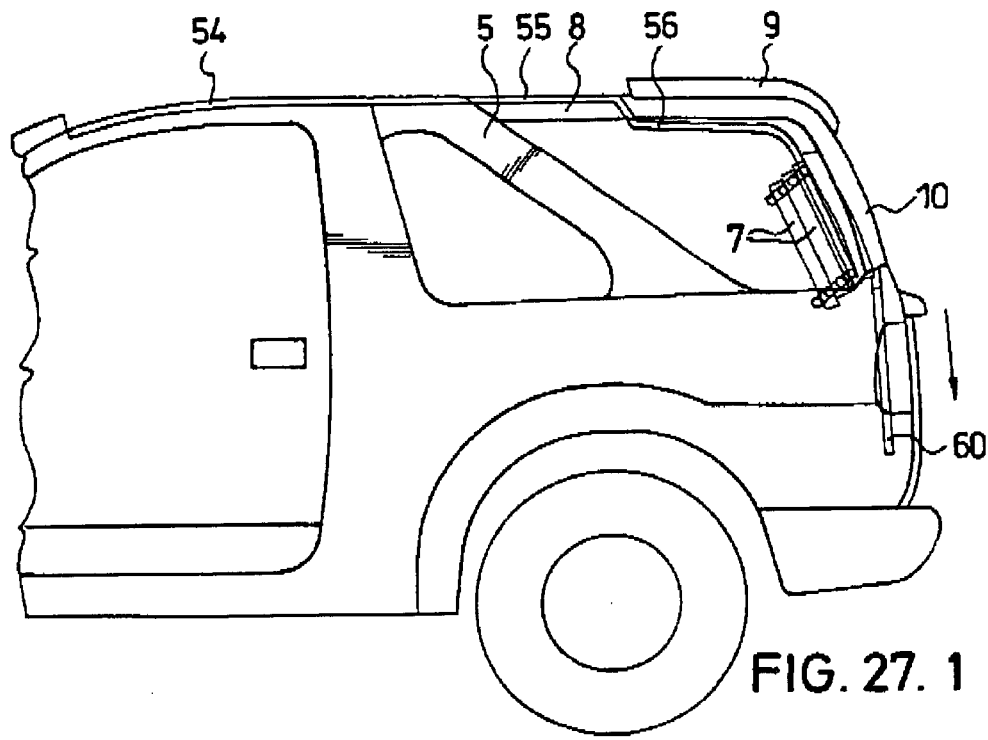
FIGS. 27.1 and 27.2 each show a schematic side view of yet another embodiment of the convertible roof, FIG. 27.1 showing the storage space for louvered roof parts of a louvered roof while FIG. 27.2 shows the same embodiment with the motor vehicle roof in an opened configuration.
Figure 27:
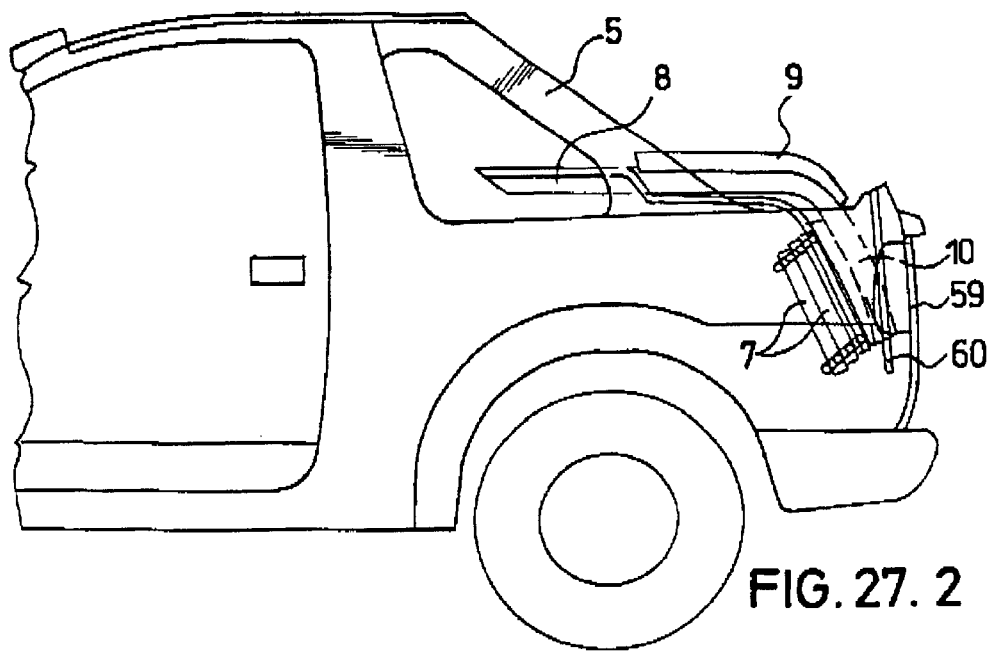

FIGS. 27.1 and 27.2 show one modification of the embodiment as shown in FIGS. 24.1 and 24.2 in that the storage space for the louvered roof parts 7 are located on the rear element 10. Lowering takes place otherwise in a similar manner as shown in FIG. 27.2.

FIGS. 28.1 and 28.2 show a modification of the embodiment as shown in FIGS. 25.1 and 25.2 in that the storage space for the louvered roof parts 7 are located on the rear element 10. Lowering takes place otherwise in a similar manner.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. Convertible motor vehicle roof of a motor vehicle comprising:
   at least one roof part supported to move lengthwise on a side roof member of the motor vehicle, the at least one roof part being movable into a storage position when the vehicle roof is being opened;
   wherein the at least one roof part is movable to one of a roof unit and a rear unit prior to lowering the vehicle roof into a storage space;
   wherein the rear unit includes a rear element that extends between two lateral rear columns of the vehicle; and
   wherein at least one of the two lateral rear columns are movably supported at lower ends on a guideway on a motor vehicle side part.

2. Motor vehicle roof as claimed in claim 1, wherein the at least one roof part is movable into the storage position together with one of the roof unit and the rear unit.

3. Motor vehicle roof as claimed in claim 1, wherein the storage position for the at least one roof part is located on one of a roof cassette, a rear element and a rear door.

4. Motor vehicle roof as claimed in claim 1, wherein the roof unit is a roof cassette which forms a rear roof section of the motor vehicle and contains the storage position for the roof part.

5. Motor vehicle roof as claimed in claim 4, wherein the side roof member is located in front of one of the roof unit and the roof cassette and is moved by a bearing means at least one of laterally next to the roof cassette and within the roof cassette as the vehicle roof is opened.

6. Motor vehicle roof as claimed in claim 1, wherein a roof cassette is supported on a motor vehicle side part by at least one of the two lateral rear columns that are hinged to the roof cassette, the at least one of the two lateral rear columns being swung into a side horizontal position when the roof cassette is lowered.

7. Motor vehicle roof as claimed in claim 4, wherein the roof cassette is movably supported by a front rod mounted on a motor vehicle side part, and the front rod in conjunction with a respective one of the two rear columns of the motor vehicle, forms a four-bar mechanism by which the roof cassette is lowerable into the storage space.

8. Motor vehicle roof as claimed in claim 5, wherein the side roof member is located in the lengthwise direction of the motor vehicle in front of one of the roof unit and the roof cassette is positioned laterally on the roof cassette by the bearing means when the roof is opened.

9. Motor vehicle roof as claimed in claim 3, wherein the roof cassette is supported on a motor vehicle side part by the lateral rear column, the lateral rear columns being hinged to the roof cassette, and swivelling into a lateral horizontal position when the roof cassette is lowered.

* * * * *